United States Patent
George et al.

(10) Patent No.: US 12,354,484 B2
(45) Date of Patent: Jul. 8, 2025

(54) ACCESS-DOOR-INTEGRATED WIRELESS INTERCOM SYSTEM

(71) Applicant: ISRAEL AEROSPACE INDUSTRIES LTD., Lod (IL)

(72) Inventors: Nimrod George, Giv'at Shmuel (IL); Ran Braier, Shoham (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 382 days.

(21) Appl. No.: 17/913,932

(22) PCT Filed: Mar. 9, 2021

(86) PCT No.: PCT/IL2021/050258
§ 371 (c)(1),
(2) Date: Sep. 23, 2022

(87) PCT Pub. No.: WO2021/199023
PCT Pub. Date: Oct. 7, 2021

(65) Prior Publication Data
US 2023/0343224 A1    Oct. 26, 2023

(30) Foreign Application Priority Data
Mar. 29, 2020  (IL) .......................................... 273677

(51) Int. Cl.
*G08G 5/26*    (2025.01)
(52) U.S. Cl.
CPC ..................................... *G08G 5/26* (2025.01)
(58) Field of Classification Search
CPC .. H04B 7/18506; H04B 7/18502; B64C 1/36; G08G 5/0013
See application file for complete search history.

(56) References Cited

U.S. PATENT DOCUMENTS

| 3,999,015 | A  | 12/1976 | Snyder et al. |
| 6,950,627 | B2 | 9/2005  | Vicari |

(Continued)

FOREIGN PATENT DOCUMENTS

| JP | 2004276870 A | * | 10/2004 |
| WO | 2008030336 A1 |  | 3/2008 |

OTHER PUBLICATIONS

MAB Technical Training, Ground Flight Arrival Communication (Screen captures), Oct. 9, 2018, Youtube, pp. 1-4, <https://www.youtube.com/watch?v=MDqPvKzs-jQ> (Year: 2018).*

(Continued)

*Primary Examiner* — Justin S Lee
(74) *Attorney, Agent, or Firm* — Dorsey & Whitney LLP

(57) ABSTRACT

A system of wireless communication between a ground intercom of an aircraft and external systems comprises: a) an access door of a ground intercom access compartment of the aircraft, the door configured to be fixed to the compartment; b) a wireless ground intercom communications processing circuitry comprised in the door; and c) antenna(s) comprised in the door. The compartment comprises a ground intercom access panel, which comprises socket(s). The processing circuitry is operatively connectable to the ground intercom of the aircraft, via the panel, and to the antenna(s Plug(s) are connected to the processing circuitry, and are configured for plugging into the socket(s). This thereby enables retrofit of the system on an existing aircraft, by means of plugging the plug(s) into socket(s) of an existing ground intercom access panel of the aircraft. The system selectively provides wireless communication between the aircraft's ground intercom and the external system(s).

19 Claims, 8 Drawing Sheets

(56) References Cited

U.S. PATENT DOCUMENTS

| | | | |
|---|---|---|---|
| 2004/0192362 A1 | 9/2004 | Vicari | |
| 2008/0064332 A1* | 3/2008 | Lee .................... | H04B 7/18506 |
| | | | 455/431 |
| 2010/0311335 A1* | 12/2010 | Durand .............. | H04B 7/18515 |
| | | | 343/705 |
| 2012/0225685 A1* | 9/2012 | Broadley ............. | H04W 84/08 |
| | | | 455/518 |
| 2021/0233420 A1* | 7/2021 | Daigle ................. | H04W 24/04 |

OTHER PUBLICATIONS

International Search Report and Written Opinion mailed Jun. 17, 2021 in PCT/IL2021/050258.

* cited by examiner

ACCESS-DOOR-INTEGRATED WIRELESS INTERCOM SYSTEM

TECHNICAL FIELD

The presently disclosed subject matter relates to aircraft intercoms.

BACKGROUND

When aircraft such as airplanes are on the ground, ground crewmen and vehicles are able to communicate directly with the pilot by means of a ground intercom system comprised in the aircraft. This is in some examples enabled by a communication system associated with a ground crewman or vehicle, which is connected to a cable. The cable is configured to be plugged into, and unplugged from, a ground intercom access panel of the aircraft, as needed.

GENERAL DESCRIPTION

According to a first aspect of the presently disclosed subject matter there is presented a system configured to enable wireless communication between a ground intercom of an aircraft and at least one external system, the system comprising:
  a) an access door of a ground intercom access compartment of the aircraft, the access door configured for (to be fixed to the ground intercom access compartment;
  b) a wireless ground intercom communication processing circuitry comprised in the access door; and
  c) at least one antenna comprised in the access door, operatively coupled to the wireless ground intercom communication processing circuitry;
  the ground intercom access compartment comprising a ground intercom access panel, the ground intercom access panel comprising at least one socket;
  the wireless ground intercom communication processing circuitry is operatively connectable to the ground intercom of the aircraft via the ground intercom access panel, wherein the connecting of the wireless ground intercom processing circuitry to the ground intercom access panel is via at least one plug connected to the processing circuitry and configured to be plugged into the at least one socket of the ground intercom access panel, thereby enabling retrofit of a communication system on an aircraft;
  the wireless ground intercom communications processing circuitry is configured to selectively provide wireless communication, via the at least one antenna, between the ground intercom of the aircraft and the at least one external system.

In addition to the above features, the system according to this aspect of the presently disclosed subject matter can include one or more of features (i) to (xxx) listed below, in any desired combination or permutation which is technically possible:
  (i) the at least one antenna is configured such that an external surface of the at least one antenna is substantially flush with an external surface of the access door.
  (ii) the access door comprises a recess on an external side, the recess configured to enable mounting of the at least one antenna.
  (iii) the at least one antenna is printed on the external surface of the door.
  (iv) the fixed mounting of the access door to the ground intercom access compartment utlizes at least one hinge.
  (v) the access door comprises at least one latch, the latch being configured to enable closing the access door.
  (vi) the at least one plug is configured with a return spring.
  (vii) the wireless communication between the ground intercom and the at least one external system comprises two-way communication.
  (viii) the wireless communication utilizes at least one of: cellular communication, WiFi, WiMAX, Bluetooth and DECT.
  (ix) the system supports multiple wireless communication protocols, where a communication protocol is selectively used by the processing circuitry based on a communication protocol supported by the at least one external system.
  (x) the system is configured to enable initial communication from the at least one external system to the ground intercom within 0.5 seconds.
  (xi) the aircraft is an airplane.
  (xii) the at least one at least one external system comprises at least one ground-based system, wherein the at least one ground-based system is deployed on at least one of: a ground vehicle, a system carryable by a ground personnel, a control tower, a communications switching system, and another vehicle.
  (xiii) the ground vehicle is a Taxibot®.
  (xiv) the other vehicle is an aircraft.
  (xv) the wireless ground intercom communications processing circuitry is configured, for selectively providing the wireless communication , to:
    a) in response to receiving a request to initiate the wireless communication between the ground intercom, at least one external system, and the aircraft, the request comprising information indicative of the at least one external system,
    determine whether the at least one external system is authorized for the wireless communication; and
    b) in response to determining that the at least one external system is authorized for the wireless communication, enable a voice communication link between the ground intercom of the aircraft and the at least one external system.
  (xvi) selectively providing the wireless communication is performed in response to detecting that the aircraft is on the ground.
  (xvii) detecting, that the aircraft is on the ground, comprises at least one of: detecting Weight on Wheels (WOW), an altimeter reading, a temperature reading, and a speed reading.
  (xviii) enabling of the voice communication link is performed
    a) responsive to determining that the external system(s) is prioritized for intercom communication.
  (xix) enabling of the voice communication link is performed
    b) responsive to determining that the external system(s) is not prioritized for intercom communication and that the ground intercom is not in use.
  (xx) enabling of the voice communication link is performed
    c) responsive to sending a request to an air crewman and receiving an approval response from the air crewman.
  (xxi) enabling of the voice communication link is performed
    d) responsive to receiving the approval response from the air crewman within a defined number of air crewman request attempts.

(xxii) determining that the external system is prioritized for the intercom communication is performed by utilizing a switching component.
(xxiii) determining, whether the external system(s) is authorized for wireless communication, is performed or carried out utilizing a switching component.
(xxiv) the switching component is comprised in the system.
(xxv) the switching component is associated with an airport terminal.
(xxvi) the request to initiate the wireless communication comprises information indicative of the aircraft.
(xxvii) the step (a) further comprises identifying the aircraft.
(xxviii) identifying the aircraft comprises at least one of: scanning a barcode and identifying an identification number on the aircraft.
(xxix) identifying of the identification number on the aircraft utilizes automated image recognition.
(xxx) the identification number appears on a tail of the aircraft.

According to a second first aspect of the presently disclosed subject matter there is presented a system configured to enable wireless communication between a ground intercom of an aircraft and at least one external system, the system comprising:
a) an access door of a ground intercom access compartment of the aircraft, the access door configured for fixed mounting to the ground intercom access compartment;
b) a wireless ground intercom communications processing circuitry comprised in a ground intercom access panel, the ground intercom access panel comprised in the ground intercom access compartment of the aircraft; and
c) at least one antenna mountable on the access door of the ground intercom access compartment,
the wireless ground intercom communications processing circuitry operatively coupled via the ground intercom access panel to the ground intercom of the aircraft,
the wireless ground intercom communications processing circuitry operatively coupled to the at least one antenna,
the wireless ground intercom communications processing circuitry configured to selectively provide wireless communication, via the at least one antenna, between the ground intercom of the aircraft and the at least one external system.

This aspect of the disclosed subject matter can optionally include one or more of features (i) to (xxx) listed above, mutatis mutandis, in any desired combination or permutation which is technically possible.

According to a fifth aspect of the presently disclosed subject matter there is presented the computerized method performed by the system of any of the above aspects.

According to a sixth aspect of the presently disclosed subject matter there is presented a non-transitory program storage device readable by machine, tangibly embodying a program of instructions that, when executed by a computer, cause the computer to perform any of the above methods.

According to a seventh aspect of the presently disclosed subject matter there is presented a method of refitting a communication system of an aircraft, the method comprising:
I) detaching an existing access door of a ground intercom access compartment of the aircraft, wherein the ground intercom access compartment comprising a ground intercom access panel, the ground intercom access panel comprising at least one socket;
II) fixedly attaching an intelligent access door to the ground intercom access compartment,
wherein the intelligent access door comprises:
a) at least one antenna; and
b) a wireless ground intercom communication processing circuitry, operatively coupled to the at least one antenna, the wireless ground intercom communications processing circuitry configured to selectively provide wireless communication, via the at least one antenna, between a ground intercom of the aircraft and the at least one external; and
III) plugging, into at least one socket of the ground intercom access panel, at least one plug connected to the wireless ground intercom processing circuitry, thereby operatively connecting the wireless ground intercom communication processing circuitry to the ground intercom of the aircraft via the ground intercom access panel.

The methods, computerized methods, and the non-transitory computer readable storage media, disclosed herein according to various aspects, can optionally further comprise one or more of features (i) to (xxx) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
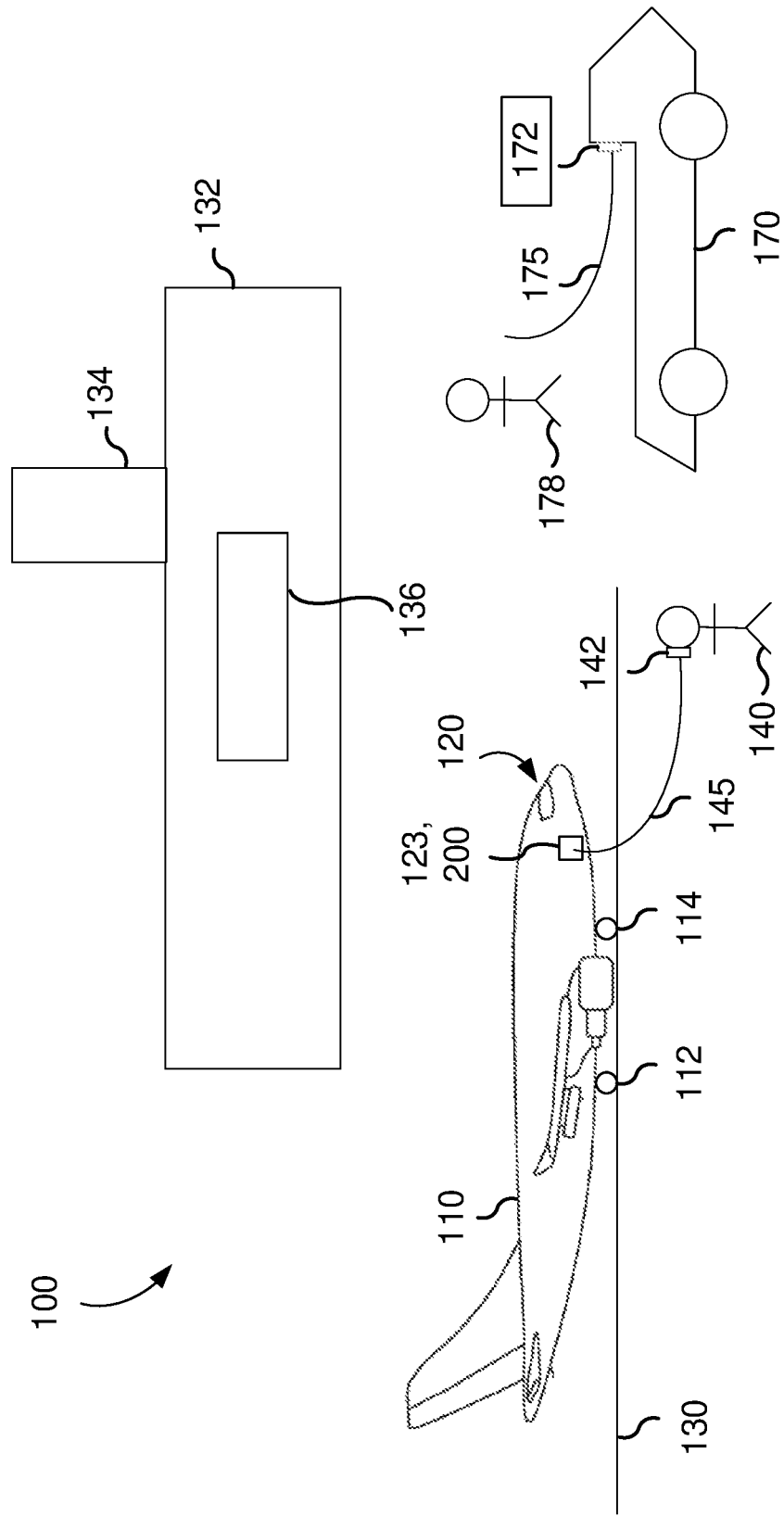
FIG. 1 illustrates schematically an exemplary generalized view of ground intercom communication, in accordance with some embodiments of the presently disclosed subject matter.

In the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

Unless specifically stated otherwise, as apparent from the following discussions, it is appreciated that throughout the specification discussions utilizing terms such as "providing", "receiving", "enabling", "determining" or the like, refer to the action(s) and/or process(es) of a computer that manipulate and/or transform data into other data, said data represented as physical, e.g. such as electronic or mechanical quantities, and/or said data representing the physical objects. The term "computer" should be expansively construed to cover any kind of hardware-based electronic device with data processing capabilities including a personal computer, a server, a computing system, a communication device, a processor or processing unit (e.g. digital signal processor (DSP), a microcontroller, a microprocessor, a field programmable gate array (FPGA), an application specific integrated circuit (ASIC), etc.), and any other electronic computing device, including, by way of non-limiting example, systems 300 and 310, and processing circuitry 320, disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

The terms "non-transitory memory" and "non-transitory storage medium" used herein should be expansively construed to cover any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases", "one example", "some examples", "other examples" or variants thereof means that a particular described method, procedure, component, structure, feature or characteristic described in connection with the embodiment(s) is included in at least one embodiment of the presently disclosed subject matter, but not necessarily in all embodiments. The appearance of the same term does not necessarily refer to the same embodiment(s) or example(s).

Usage of conditional language, such as "may", "might", or variants thereof, should be construed as conveying that one or more examples of the subject matter may include, while one or more other examples of the subject matter may not necessarily include, certain methods, procedures, components and features. Thus such conditional language is not generally intended to imply that a particular described method, procedure, component or circuit is necessarily included in all examples of the subject matter. Moreover, the usage of non-conditional language does not necessarily imply that a particular described method, procedure, component or circuit is necessarily included in all examples of the subject matter.

It is appreciated that certain embodiments, methods, procedures, components or features of the presently disclosed subject matter, which are, for clarity, described in the context of separate embodiments or examples, may also be provided in combination in a single embodiment or examples. Conversely, various embodiments, methods, procedures, components or features of the presently disclosed subject matter, which are, for brevity, described in the context of a single embodiment, may also be provided separately or in any suitable sub-combination.

It should also be noted that each of the figures herein, and the text discussion of each figure, describe one aspect of the presently disclosed subject matter in an informative manner only, by way of non-limiting example, for clarity of explanation only. It will be understood that that the teachings of the presently disclosed subject matter are not bound by what is described with reference to any of the figures or described in other documents referenced in this application.

Bearing this in mind, attention is drawn to FIG. 1, schematically illustrating an example generalized view of ground intercom communication, in accordance with some embodiments of the presently disclosed subject matter. In some examples, airports currently function as disclosed in situation 100.

An aircraft 110, e.g. an airplane, is shown with its wheels 112, 114 on the ground 130, e.g. on the tarmac of an airport, airfield or air base. In some examples, aircraft 110 is a passenger airplane. The airport terminal 132 is shown as comprising a control tower 134, and control room(s)/control center 136. The aircraft may, in some examples, be on the runway, before take-off or after landing, or may be taxiing to or from the terminal or a hangar (not shown). In some examples, the aircraft 110 is attached to vehicle 170. In some examples, 170 is towing the aircraft. One non-limiting example of vehicle 170 is the Taxibot® tractor.

In some examples, the vehicle 170, and/or a person 140 such as, for example, a ground crewman, are able to communicate directly with the pilot 120, by means of a ground intercom system (not shown) comprised in the aircraft. Pilot 120 is a non-limiting example of cockpit aircrew 120. Examples of other cockpit aircrew are the co-pilot. For this purpose, example aircraft 110 comprises components 200 for connecting the aircraft's ground intercom system (not shown) to external systems, including ground intercom access panel 123. Panel 123 is in some examples referred to herein also as a ground service intercom panel. More detail, concerning examples of 200 and of panel 123, is disclosed further herein with reference to FIG. 2. Panel 123 is operatively coupled (not shown) to the headphones and microphone of pilot or co-pilot 120.

In the figure, person 140, e.g. a first ground crewman, is wearing headphones and microphone 142, which can be connected by cable 145 to ground intercom access panel 123. In one example, the ground crewman 140 is guiding the airplane to or from the terminal, e.g. guiding a pushback of the airplane 110.

In some examples, vehicle 170 comprises a vehicle-based communications system 172, which can be connected by cable 175 by a second ground crewman 178 to ground intercom access panel 123. In some examples, a third ground crewman (not shown) sitting in the vehicle can use this intercom connection to communicate with pilot 120. In some examples, the second and third ground crewmen are the same person. Example methods of connecting and disconnecting cables 145, 175 to/from panel 123 are disclosed with reference to FIG. 2. In the example of the figure, the person 140 is already connected to the aircraft's ground intercom, and therefore the vehicle 170 cannot connect to the aircraft's ground intercom until the person 140 disconnects.

The ground intercom connection in some examples enables a point-to-point voice/audio communication link for speech (speaking and hearing) communication between pilot/aircrew 120, and person 140 or member of the crew 178 of vehicle 170, and in some cases for audio alerts to the pilot 120. Vehicle-based communications system 172 and headphones and microphone 142 are non-limiting examples of external systems configured to communicate with pilot 120 via the ground intercom. These external systems are also referred to herein, in some examples, as external communications systems 142, 172.

Figure 2:
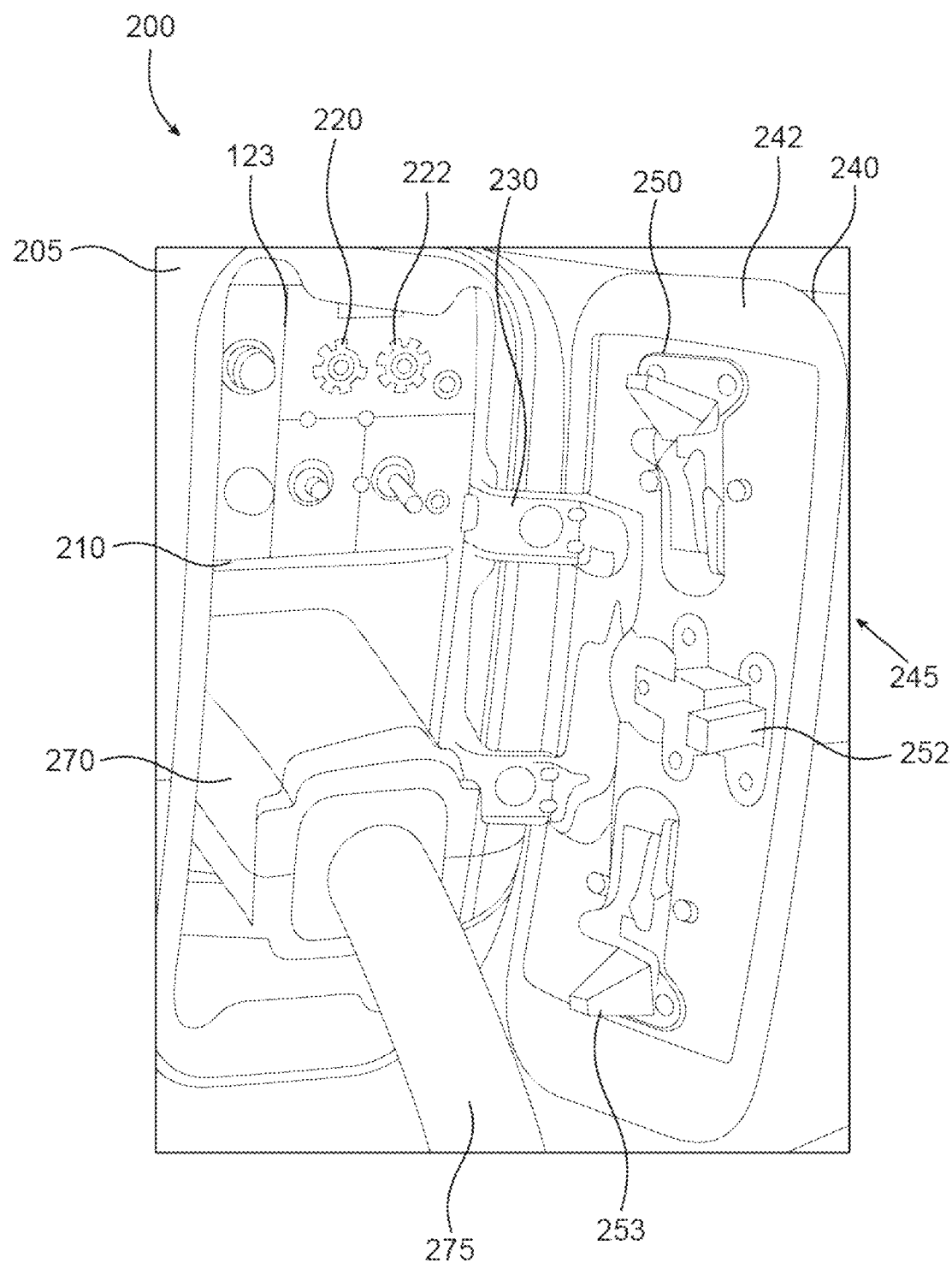
FIG. 2 schematically illustrates an exemplary generalized depiction of a ground intercom access compartment, in accordance with some embodiments of the presently disclosed subject matter.

Attention is now drawn to FIG. 2, schematically illustrating an exemplary generalized depiction 200 of a ground intercom access compartment, in accordance with some embodiments of the presently disclosed subject matter.

The components 200 together provide or enable the external interface of the intercom system to external systems 142, 172. Ground intercom access compartment 210 in some examples sits within the body 205 of the aircraft 110. The compartment 210 comprises ground intercom access panel 123. In some cases, access panel 123 includes one or more sockets 220, 222. Cables 145, 175 have, at their end, connector plugs (not shown), which are configured to plug into socket(s) 220, 222. In the non-limiting example of the figure, two sockets 220, 222 are shown. Wiring or other circuitry (not shown), located behind the panel 123, in some examples connects the sockets 220, 222 to ground intercom voice systems (not shown) located in the cockpit of the aircraft. When intercom communication to the pilot is no longer needed, the ground crewman 140, 178 can unplug the cables 145, 175 from sockets 220, 222.

In some examples, there is an access door 240 for the intercom access compartment 210. In the example of the figure, door 240 is attached to the compartment 210 by means of two hinges 230—for example screwed to the hinges. In the figure, the access door 240 is shown in the open position. In some examples, when the door 240 is closed it is held closed to the body of the compartment 210 by means of latches or other locking devices, e.g. the three latches 250, 252, 253 shown. In some examples, one or more buttons (not shown) are used to help close and open the latches. Additional disclosure of the buttons is provided herein with reference to FIGS. 3A and 5A, 5B.

In some examples, the door 240 has two sides—the interior side 242 which faces the compartment 210, and the exterior side 245 which faces away from the aircraft. In some cases, the access door 210, and particularly its exterior side 245, are shaped in such a manner that the aerodynamic properties of aircraft 110 are not compromised by the existence of door 210 when the door is in the closed position, or are compromised to a minimum possible extent (e.g. cause minimal drag). When the door is in the open position, cable 145, 175 access to the sockets 220, 222 of the access panel is possible. The door 240 is typically closed when not in use. Particularly, the door is typically to be closed before take-off and flight.

Note that in the particular example of the figure, there is also shown a power cable 275, connected via power connector 270, to a power component of aircraft 110. This cable and connector are not associated with the ground intercom system, and are not part of components 200.

In some cases, a cable-based intercom system has at least some or all of the following disadvantages. A human 140, 178 must perform the connection and disconnection between cables 145, 175 and access panel 123. This adds additional, manual, steps to the process of establishing and disconnecting ground intercom communication links. Also, the person must perform this in proximity to the engines of aircraft 110, and possibly to a moving aircraft 110, which, in some cases, may be dangerous. In addition, in a case where vehicle 170 is an autonomous vehicle, there would be a need to have a second person 178 ride or otherwise escort the otherwise-unmanned vehicle, just to perform the manual connect/disconnect of the cables, causing additional human resources expense. Also, the need for this second ground crewman 178 to ride in the vehicle may in some cases require that the autonomous vehicle 170 be especially designed to accommodate ground crewman 178.

In addition to the above issues, the cable itself presents certain disadvantages. The cable 145, 175 is an additional part to keep in the airport inventory, to maintain and service, to order and replace etc. Also, the cable has a finite length, and thus the possible distance supported by the ground intercom communication link is limited by the length of the particular cable used. The process of manipulating the cable in the vicinity of the aircraft, especially a long one, is, in some cases, a cumbersome one. Also, there is a risk of the cable getting caught, torn or otherwise damaged, as the ground crewman 140, 178 manipulates the cable. For example, the aircraft 110 or vehicle 170 may run over the cable, or get caught in it. This is especially true of a long cable of, for example, 12 meters length or more.

In FIGS. 3A to 7 below, there are disclosed structures, use situations, and flows, for a system 300 for wireless communication between a ground intercom of an aircraft 110 and at least one external system. This system is also referred to herein, in some examples, as an access-door-integrated wireless intercom system 300. In some examples, the system includes at least the following:

a) an access door of a ground intercom access compartment 210. The access door is configured for to be fixed to the ground intercom access compartment, by fixable mounting;

b) wireless ground intercom communications processing circuitry. In some examples, this circuitry is fixedly mounted or otherwise comprised on the access door;

c) one or more antennas mounted on, or otherwise comprised in, the access door.

As disclosed with reference to FIG. 2, the ground intercom access compartment 210 includes a ground intercom access panel 123, which has one or more sockets 220, 222.

In some examples, the wireless ground intercom communications processing circuitry is operatively connected or coupled via the access panel to the on-board ground intercom of the aircraft, via one or more plugs, which are connected to the processing circuitry and which are configured for plugging into the socket(s) of the ground intercom access panel 123.

In some examples, the wireless ground intercom communications processing circuitry is operatively connected or coupled to the antenna(s). In some examples, this processing circuitry is configured to selectively provide wireless communication, via the antenna(s), between the ground intercom of the aircraft and one or more external systems.

In some examples, such an access-door-integrated wireless intercom system 300 is capable of enabling a retrofit of the system 300 on an existing aircraft 110, by means of plugging the plug(s) into the socket(s) of an existing ground intercom access panel 123 of the existing aircraft. As is disclosed with reference to FIG. 4, this retrofit can in some examples enable the providing of a permanent wireless intercom interface to external communications systems, that replaces an interface that utilizes the problematic cables such as 145, 175. The system 300 functions, in some examples, as a wireless adapter between the aircraft's ground intercom system and the external systems. Example advantages of such a system 300 are disclosed further herein with reference to FIG. 6.

Figure 3A:
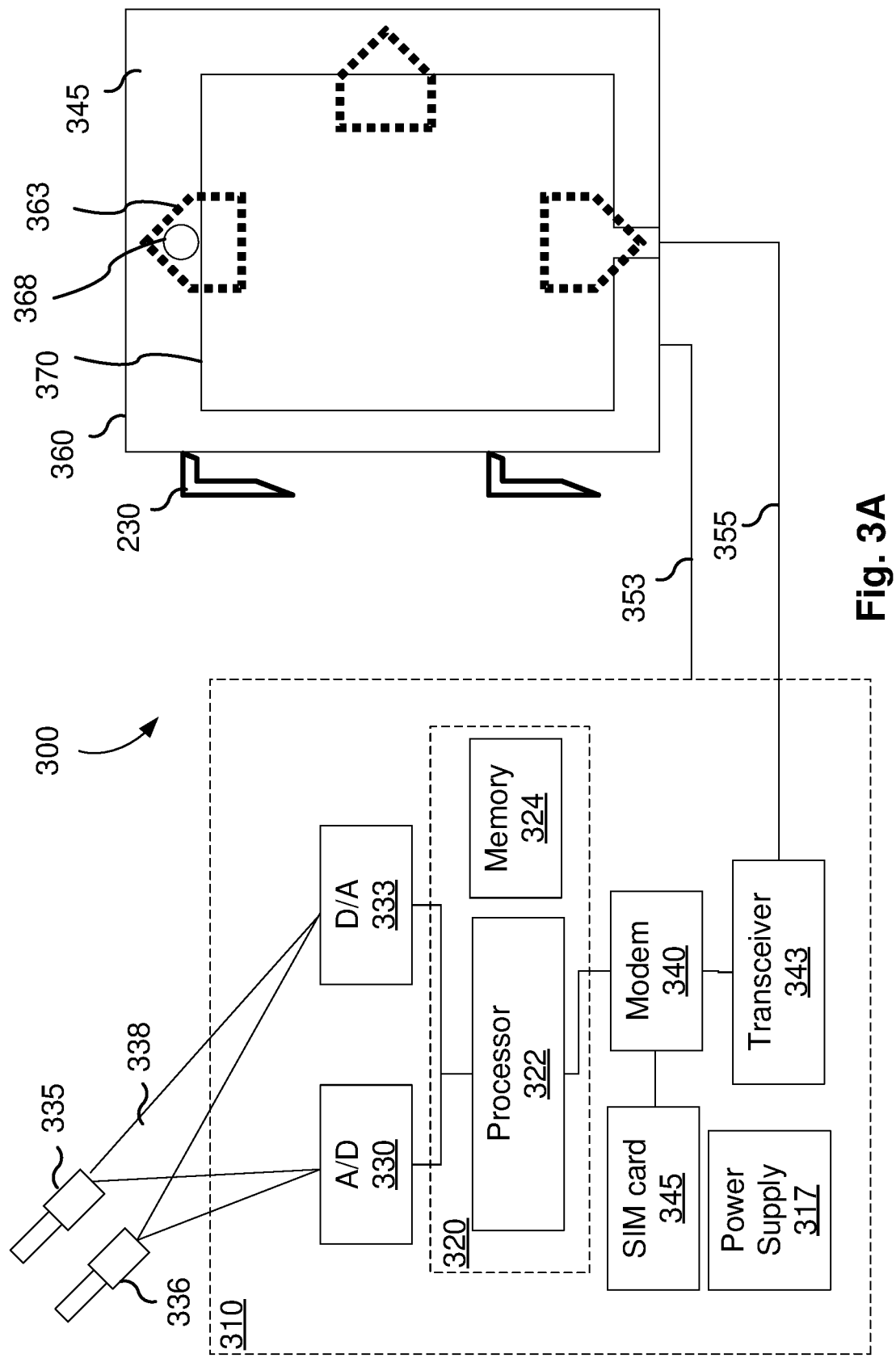
FIG. 3A schematically illustrates an exemplary generalized schematic depiction of an access-door-integrated wireless intercom system, in accordance with some embodiments of the presently disclosed subject matter.

Attention is now drawn to FIG. 3A, schematically illustrating an exemplary generalized schematic depiction of an access-door-integrated wireless intercom system 300, in accordance with some embodiments of the presently disclosed subject matter. FIG. 3A discloses a schematic view of the access-door-integrated wireless intercom system. One possible physical implementation of the access-door-integrated wireless intercom system 300 is disclosed further herein with reference to FIGS. 4, 5A, 5B and 5C.

In some examples, access-door-integrated wireless intercom system comprises one or more audio connector plugs 335, 336. The plugs 335, 336 are in some examples configured to be plugged into sockets 220, 222 on the access panel 123.

In some examples, access-door-integrated wireless intercom system comprises a wireless ground intercom communications circuit assembly 310. In some examples, wireless ground intercom communications circuit assembly 310 may include a computer. It may, by way of non-limiting example, comprise wireless ground intercom communications processing circuitry 320. Processing circuitry 320 may comprise a processor 322 and memory 324. The processing circuitry 320 may be, in non-limiting examples, general-purpose computer(s) specially configured for the desired purpose by a computer program stored in a non-transitory computer-readable storage medium. They may be configured to execute several functional modules in accordance with computer-readable instructions. In other non-limiting examples, processing circuitry 320 may be a computer(s) specially constructed for the desired purposes.

In some examples, circuit assembly 310 comprises one or more Analog to Digital (A/D) converters 330 and Digital to Analog (D/A) converters 333. In some examples, the converters 330, 333 convert signals between the circuit assembly 310 and the one or more connector plugs 335, 336. In some examples, the components 330, 333 and 335, 336 are operatively coupled via wiring 338.

Figure 7:
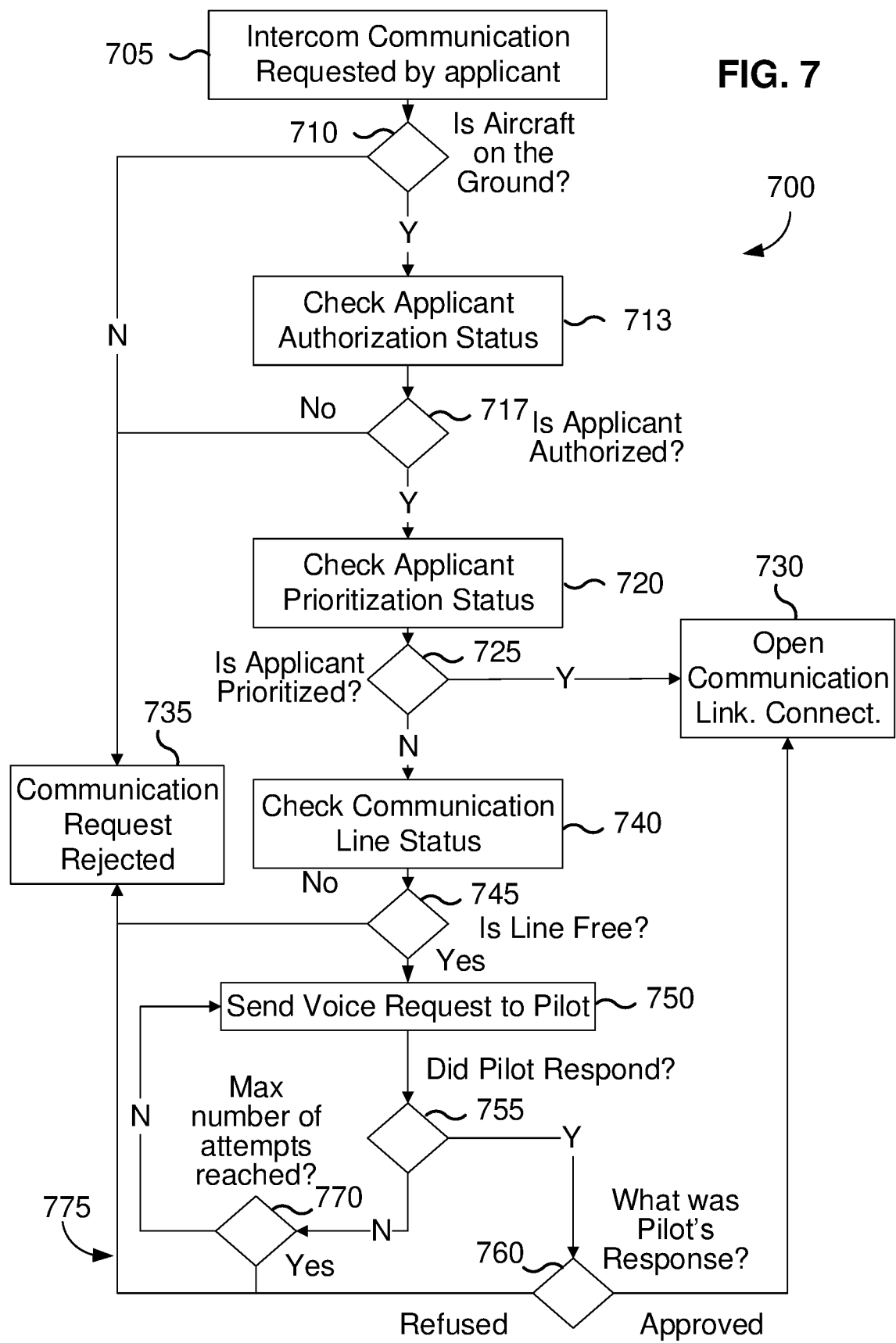
FIG. 7 illustrates a generalized exemplary flow chart diagram of a process for selectively providing wireless communication, in accordance with certain embodiments of the presently disclosed subject matter.

In some examples, processor 322 of circuit assembly 310 is configured to perform at least the communication link setup or establishment functionalities disclosed further herein with reference to FIG. 7, as well as functionalities to tear down or disconnect a communication link. Example functional modules of processor 322 are disclosed further herein with reference to FIG. 3B.

In some examples, memory 324 of circuit assembly 310 is configured to store data associated with at least the communication link setup functionalities disclosed further herein with reference to FIG. 7, as well as possibly functionalities to tear down or disconnect a communication link. For example, memory 324 in some cases stores authorization and/or prioritization data, disclosed further herein with reference to FIG. 7.

In some examples, circuit assembly 310 comprises modem 340 and transceiver 347. Transceiver 347 in some examples provides an interface to antenna 370. Modem 340 in some examples provides an interface to transceiver 347. In some examples, modem 340 comprises, or is operatively coupled with, Subscriber Identity Module (SIM) 345, e.g. a SIM card. A SIM card 345 may be utilized when the wireless interface to the external systems is, for example, a cellular interface such as GSM, UMTS, LTE or 5G (as non-limiting examples).

In some examples, circuit assembly 310 comprises power supply 317. The various electrical and electronic components of circuit assembly 310 may receive power from power supply 317. In some examples, power supply 317 is fed by the aircraft power system, e.g. via connector plugs 335, 336.

Figure 4:
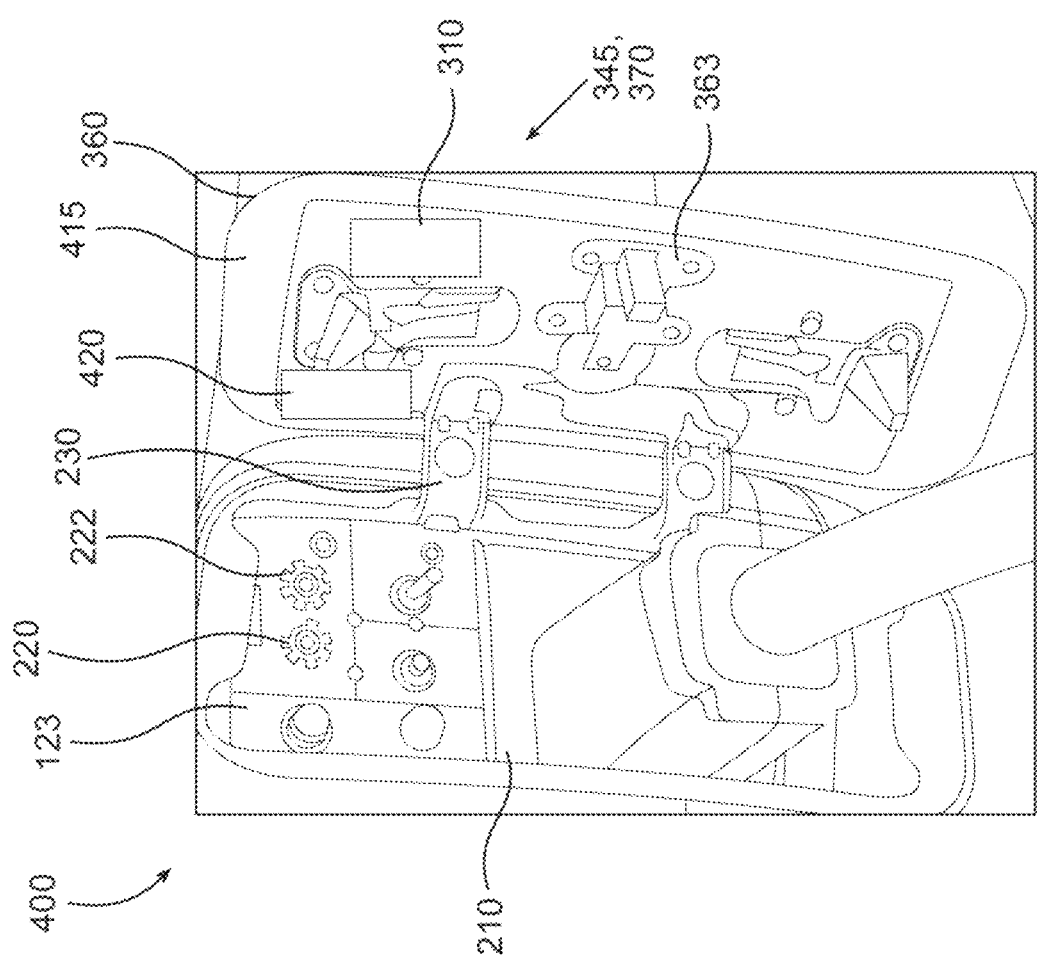
FIG. 4 schematically illustrates an exemplary generalized physical depiction of components of a wireless interface to external communications systems, in accordance with some embodiments of the presently disclosed subject matter.

A non-limiting example of physical placement of wireless ground intercom communications circuit assembly 310 is disclosed further herein with reference to FIG. 4.

In some examples, transceiver 347 of circuit assembly 310 is operatively coupled to one or more antennas 370, e.g. via wires 355. In the example of the figure, antenna 370 is fixedly mounted or otherwise attached to the exterior side or exterior surface 345 of a ground intercom access compartment access door 360. In some examples, compartment access door 360 is a variation of the existing access door 240, in which the antenna is mounted substantially flush with the exterior surface 345, e.g. as disclosed further herein with reference to FIG. 5A. In some examples, door 360 is referred to herein also as a special access-door, as antenna-mounted access door 360, or as intelligent access door 360 (in that it comprises circuitry), to distinguish it from existing access doors such as 240.

In some examples, the door 360 includes one or more latches, or other locking devices or mechanisms, reference 363. Latches 363 are in some examples utilized when opening and closing door 360, in a manner similar to that of latches 250, 252, 253 of existing access door 240. The figure shows the non-limiting example of three latches 363. In some examples, the door 360 includes one or more buttons

368. In the example of the figure, button(s) 368 is located on one of the latches 363. The button(s) are in some examples utilized when opening and closing door 360. An additional optional example function of buttons 363 is disclosed further herein with reference to FIGS. 5B and 5C.

In the example of FIG. 3A, the access door 360 is attached or mounted to an existing ground intercom access compartment 210 (not shown in this figure) by means of the existing hinges 230. In the example, hinges 230 are not part of the access-door-integrated wireless intercom system 300. One non-limiting example of such attachment is disclosed further herein with reference to FIG. 4.

In some examples, there is also a ground connection 353 between circuit assembly 310 and the access door 360. In some examples, this connects the access door ground and that of aircraft 110.

Figure 3B:
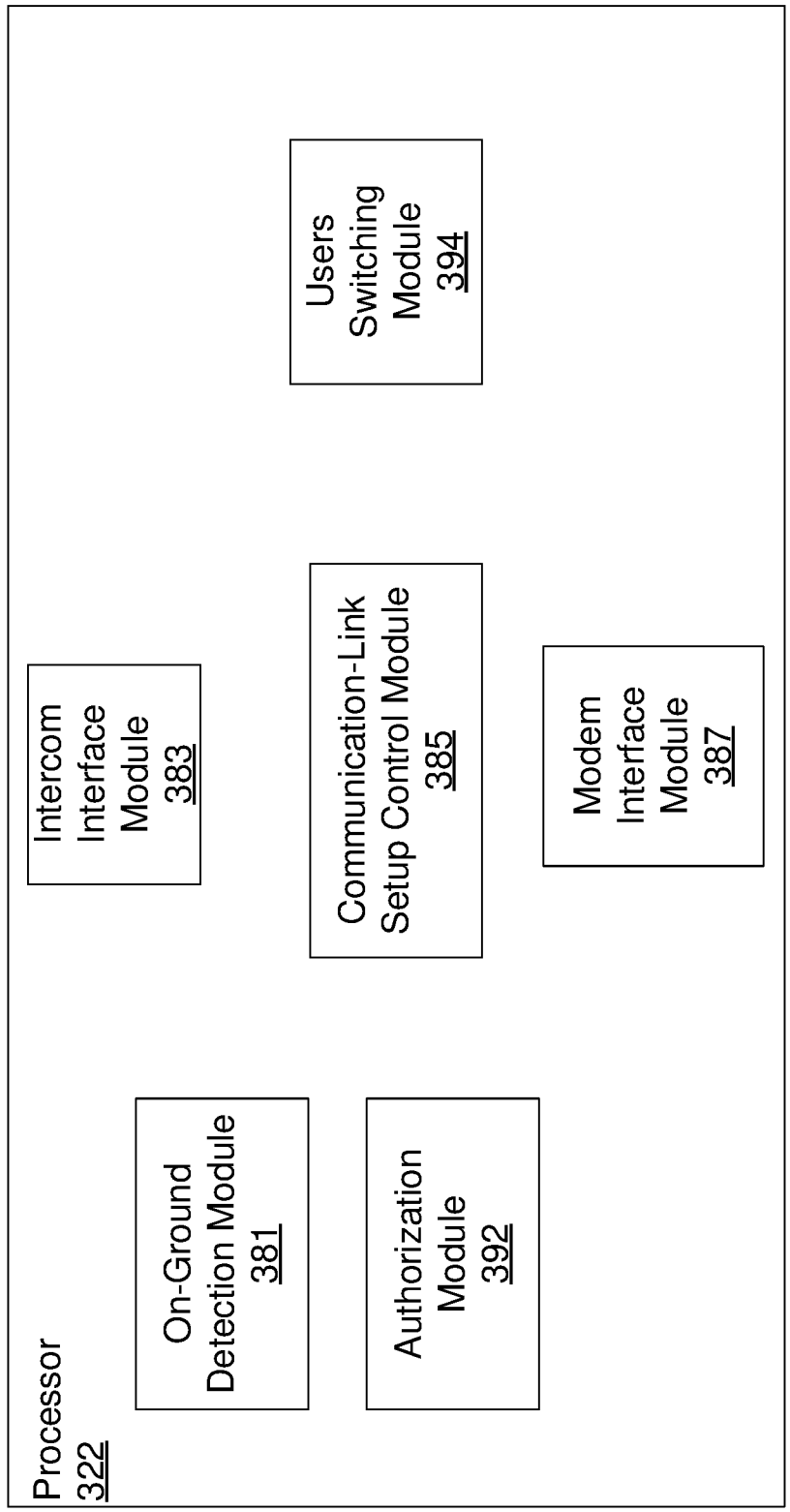
FIG. 3B illustrates an exemplary generalized schematic diagram of a processor, in accordance with some embodiments of the presently disclosed subject matter.

Attention is now drawn to FIG. 3B, illustrating an exemplary generalized schematic diagram of a processor 322, in accordance with some embodiments of the presently disclosed subject matter. Processor 322 may comprise at least one or more functional modules. In some examples it may perform at least functions, such as those disclosed further herein with reference to FIG. 7.

In some examples, processor 322 comprises communication-link setup control module 385. In some examples, this module may be configured to perform steps to set-up and to tear down wireless ground intercom communication links 622, 648, 674, 636 (in FIG. 6) between the pilot or other aircrew 120 and external systems such as 642, 672, 637 in FIG. 6.

In some examples, processor 322 comprises intercom interface module 383. In some examples, this module may be configured to provide an interface to A/D and D/A converters 330, 333, and via them and plugs 335, 336 to the aircraft's ground intercom system.

In some examples, processor 322 comprises modem interface module 387. In some examples, this module may be configured to provide an interface to modem 340, and via it to the antenna 370 and ultimately to the external systems such as 642, 672, 637.

In some examples, processor 322 comprises on-ground detection module 381. In some examples, this module may be configured to determine whether the wheels 112, 114 of aircraft 110 are on the ground 130, or, alternatively, that they are in the air. In some examples, modules 385 and 381 are operatively coupled. In some examples, the wireless ground intercom communication links will not be established by module 385 if the wheels are determined to be in the air.

In some examples, processor 322 comprises authorization module 392. In some examples, this module may be configured to determine whether a particular external system 642, 672, 637 is authorized to have wireless ground intercom communication links to the pilot or other aircrew 120. In some examples, modules 385 and 392 are operatively coupled. In some examples, the wireless ground intercom communication links will not be established by module 385 if the particular external system is determined to be unauthorized.

In some examples, processor 322 comprises users-switching module 394. In some examples, this module may be configured to switch the wireless ground intercom communication link between one user (external system 642, 672, 637) and another, based on, for example, prioritization. In some examples, modules 385 and 394 are operatively coupled. In some examples, module 385 utilizes module 394 when deciding on establishment and termination of wireless ground intercom communication links.

As already indicated, example functions of these modules are disclosed further herein with reference to FIG. 7.

Attention is now drawn to FIG. 4, schematically illustrating an exemplary generalized physical depiction 400 of components 400 of a wireless interface to external communications systems, in accordance with some embodiments of the presently disclosed subject matter. The figure shows a physical depiction 400 of an external interface, similar to that of 200, but now modified by the replacement of the existing access door 240 of existing aircraft 110 with the special access door 360, on which is comprised and mounted the antenna 370. In 400, the special access door 360 is fixedly mounted to the ground intercom access compartment 210. Note that FIG. 4 presents a physical depiction of the system of the schematic FIG. 3A, as installed into an aircraft 110. In some examples, a retrofit has been done: existing access door 240 has been detached (e.g. unscrewed) from existing hinges 230, and, instead, the special intelligent access door 360 has been fixedly attached (e.g. screwed on) to existing hinges 230, thereby fixedly mounting or attaching door 360 to the ground intercom access compartment 210.

Note that in other examples, the aircraft 110 is manufactured up-front with special access door 360, and thus no retrofit is needed.

The compartment 210 comprises ground intercom access panel 123, which comprises one or more sockets 220, 222. In the non-limiting example of the figure, two sockets 220, 222 are shown.

In some examples, access door 360 comprises circuit assembly 310 of FIG. 3, for example fixedly mounted on the inside or interior side or surface 415 of door 360. In the figure, circuit assembly 310 is indicated schematically. Antenna 370 is mounted on the exterior side 345 of the door—for example as disclosed further herein with reference to FIG. 5A. In some examples, wires 355 and/or 353, or similar circuit paths, pass from interior side 415, through the body of access door 360, to exterior side 345, connecting or otherwise operatively coupling 310 to 370 and/or 360. Mounting the antenna on the external surface 345 may in some examples enable the facing of antenna 370 away from the body of the aircraft 110, towards the surroundings of the aircraft, thus enabling wireless communication with external systems 642, 672, 637.

The figure also depicts the example of three latches or other locking devices 363, configured to enable opening and closing access door 360 onto intercom compartment 210. In some examples, before closing the door 360, plugs 335, 336 of the access-door-integrated wireless intercom system 300 are plugged into existing sockets 220, 222 on ground intercom access panel 123, thus operatively coupling circuit assembly 310 and the aircraft's on-board ground intercom system. Note that for clarity of exposition, the figure does not show plugs 335, 336, which, per FIG. 3, are connected to the processing circuitry. Nor does it show wires 338.

Figure 5A:
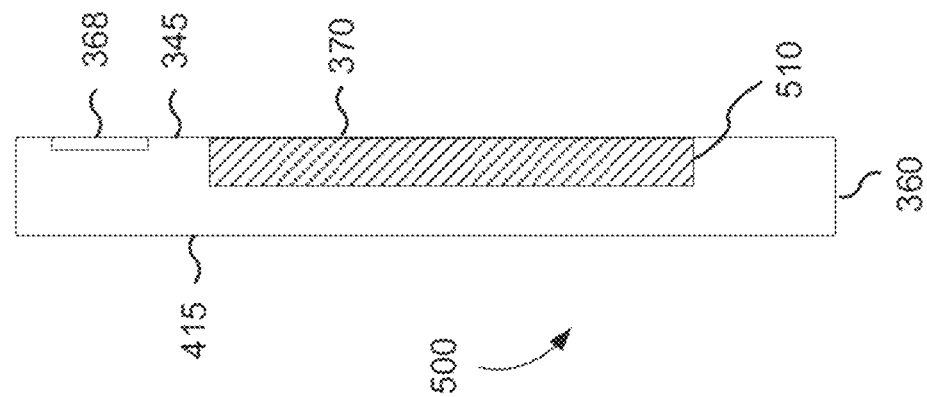
FIG. 5A schematically illustrates an exemplary side view of an antenna-mounted access door, in accordance with some embodiments of the presently disclosed subject matter.
Figure 5C:
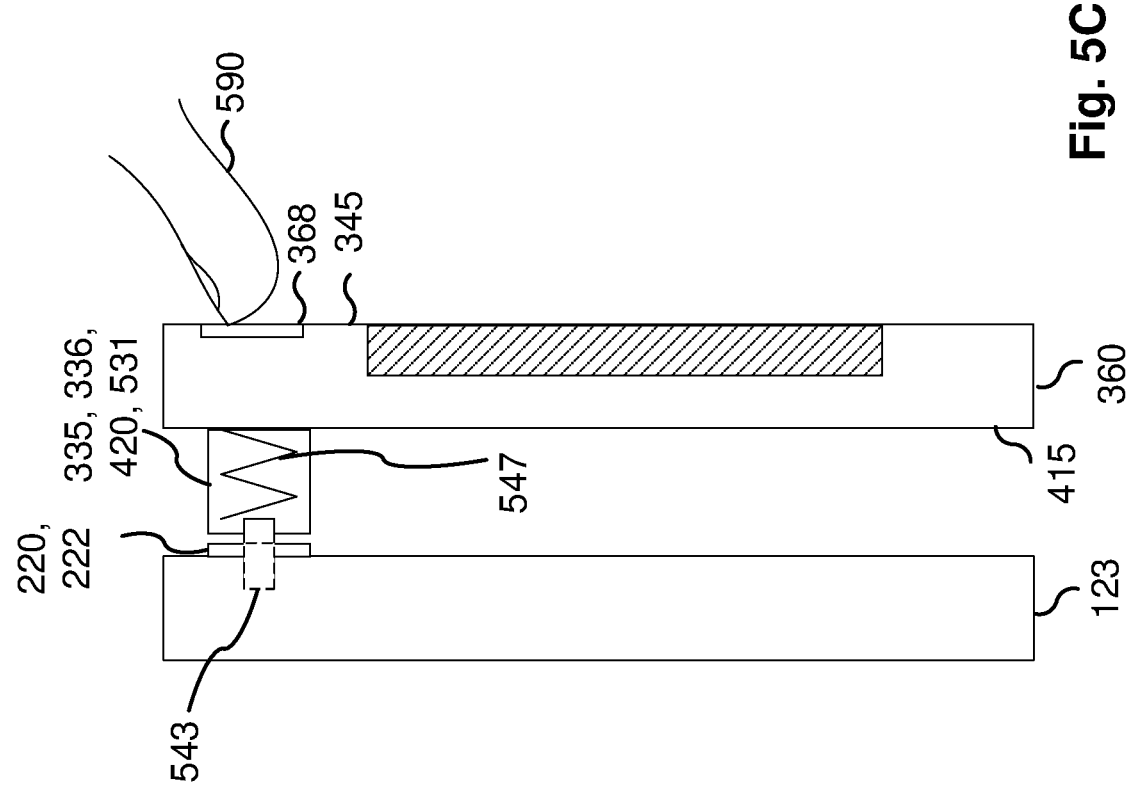
FIGS. 5B and 5C schematically illustrate an exemplary generalized depiction of a connector plug with return spring, in accordance with some embodiments of the presently disclosed subject matter.
Figure 5B:
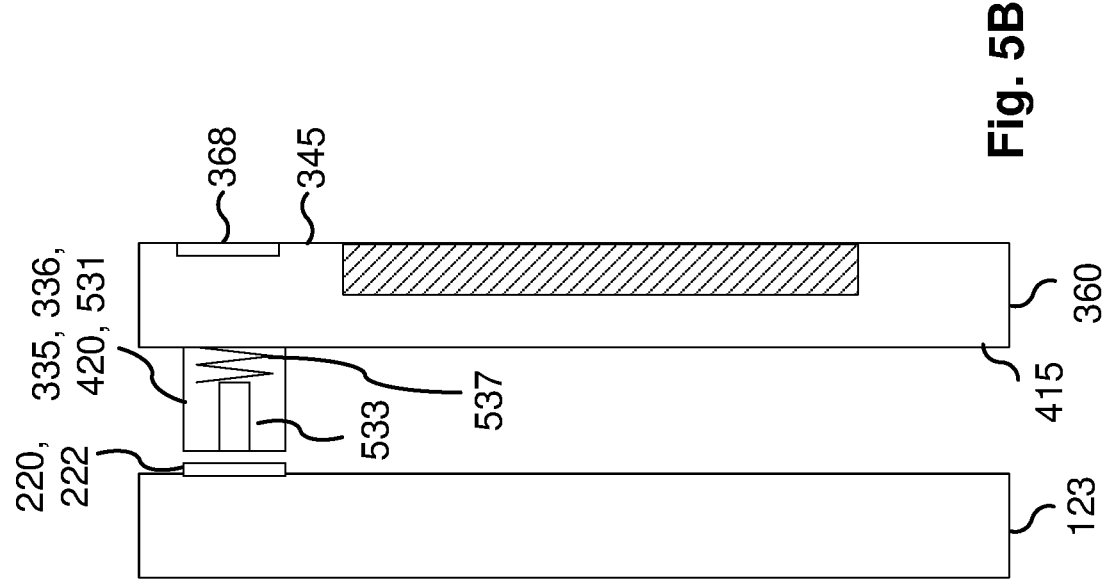

In other examples, plugs 335, 336 are configured with a return spring assembly, for example as disclosed further herein with reference to FIGS. 5B, 5C. This option is indicated in a schematic manner on FIG. 4 by return spring assembly 420, mounted for example on the interior surface 415.

Attention is now drawn to FIG. 5A, schematically illustrating an exemplary side view 500 of an antenna-mounted access door 360, in accordance with some embodiments of the presently disclosed subject matter. The side view of door 360 shows the interior 415 and exterior 345 surfaces. This view also shows a side view of button 368. Note that in the example of the figure, antenna-mounted access door 360 has a recess 510. This recess is configured to enable the mounting of antenna 370. In some examples, recess 510 is shaped such that the antenna 370, mounted on recess 510, is substantially flush with exterior surface 345. In some examples antenna 370 and exterior surface 345 lie in substantially the same plane. In some examples, antenna 370 is printed on the external surface 345 of the door 360, e.g. using three-dimensional printing techniques. In some non-limiting examples, the exterior of antenna 370 and external surface 345 are flush to within a few millimeters (mm). In some examples, they are flush to within a thickness of paint, e.g. approximately 0.1 to 0.5 mm. As technology improves in the future, it is foreseen that the exterior of antenna 370 and external surface 345 could be flush to within less than 0.1 millimeters. Mounting the antenna within such a tolerance may in some examples enable placement of an antenna on external surface 345, while not detrimentally affecting the drag and other aerodynamic properties of the aircraft 110.

Attention is now drawn to FIGS. 5B and 5C, schematically illustrating an exemplary generalized depiction of a connector plug with return spring, in accordance with some embodiments of the presently disclosed subject matter. Both figures show, in a schematic fashion, side views of the special access door 360 and intercom access panel 123, in a situation where the door 360 is in a closed position.

In the optional example of the figures, the connector plugs 335, 336 are not attached to circuit assembly 310 by a loose cable, but rather are comprised in a spring assembly 420. In some examples, spring assembly 420 comprises one or more housings 531, one or more plug pins 533, 543, and one or more return springs 537, 547. In some examples plug pin(s) 533, 543 is attached to return spring(s) 537, 547. In some examples, when door 360 is in the closed position, housing(s) 531 touch, or are in close proximity, to sockets 220, 222 of access panel 123.

In the non-limiting example situation of FIG. 5B, the spring is retracted, and pin(s) 533 is within the housing 531. Also shown is button 368, accessible from the exterior 345 of the door 360. In the non-limiting example situation of FIG. 5C, a ground crewman, for example, has pressed with his finger 590 the button 368. This activates a mechanism (not shown), which releases the spring 547. The release of the spring 547 pushes the pin(s) 543 away from the housing and the access door 360, such that the pin(s) at least partly extends out of the housing 531. The assembly is designed so that this push has sufficient force to cause the pin 543 to engage the socket 220, 222 and to complete an electrical connection with the aircraft's ground intercom system. The engagement of the pin within the socket is indicated in the figure by the dashed line portion of pin 543.

In some examples, another press of button 368 causes the pin(s) 543 to again retract to state 533, thus returning to the state depicted in FIG. 5B. In some examples, this retracting facilitates the opening of special access door 360.

It should be noted that the retrofit implementation of FIG. 3A, as depicted for example in FIGS. 4, 5B and 5C, is one non-limiting example. In other examples, the ground intercom compartment 210 and access panel 123 are modified to accommodate a wireless interface. In one such example, there are no plugs 335, 336, 420, nor pins 533, 543. Instead, the access panel 123 is a modified one (not shown in the figures), without sockets 220, 222, and the circuit assembly 310 is wired directly via the panel 123 to a ground intercom system within the aircraft 110. In still another such example, there is no circuit assembly 310 mounted on the special access door 260. Instead, the ground intercom system is designed or modified to include circuit assembly 310, which converts intercom signals to/from wireless signals. For example, the circuit assembly 310 can be comprised in panel 123, for example located on the interior (aircraft) side of the panel. In such a case, the circuit assembly 310, located internal to the aircraft, is wired directly via the panel 123 to antenna 370 located on the exterior 345, for example using wires 355, 353. This is thus a none-limiting example of a system configured to enable wireless communication between a ground intercom of an aircraft and at least one external system, the system comprising:

a) an access door of a ground intercom access compartment of the aircraft, the access door configured to be fixed to the ground intercom access compartment;

b) a wireless ground intercom communications processing circuitry comprised in a ground intercom access panel, the ground intercom access panel comprised in the ground intercom access compartment of the aircraft, the wireless ground intercom communications processing circuitry operatively coupled via the ground intercom access panel to the ground intercom of the aircraft; and c) at least one antenna mountable on the access door of the ground intercom access compartment, operatively coupled to the wireless ground intercom communications, the wireless ground intercom communications processing circuitry configured to selectively provide wireless communication, via the at least one antenna, between the ground intercom of the aircraft and the at least one external system.

Figure 6:
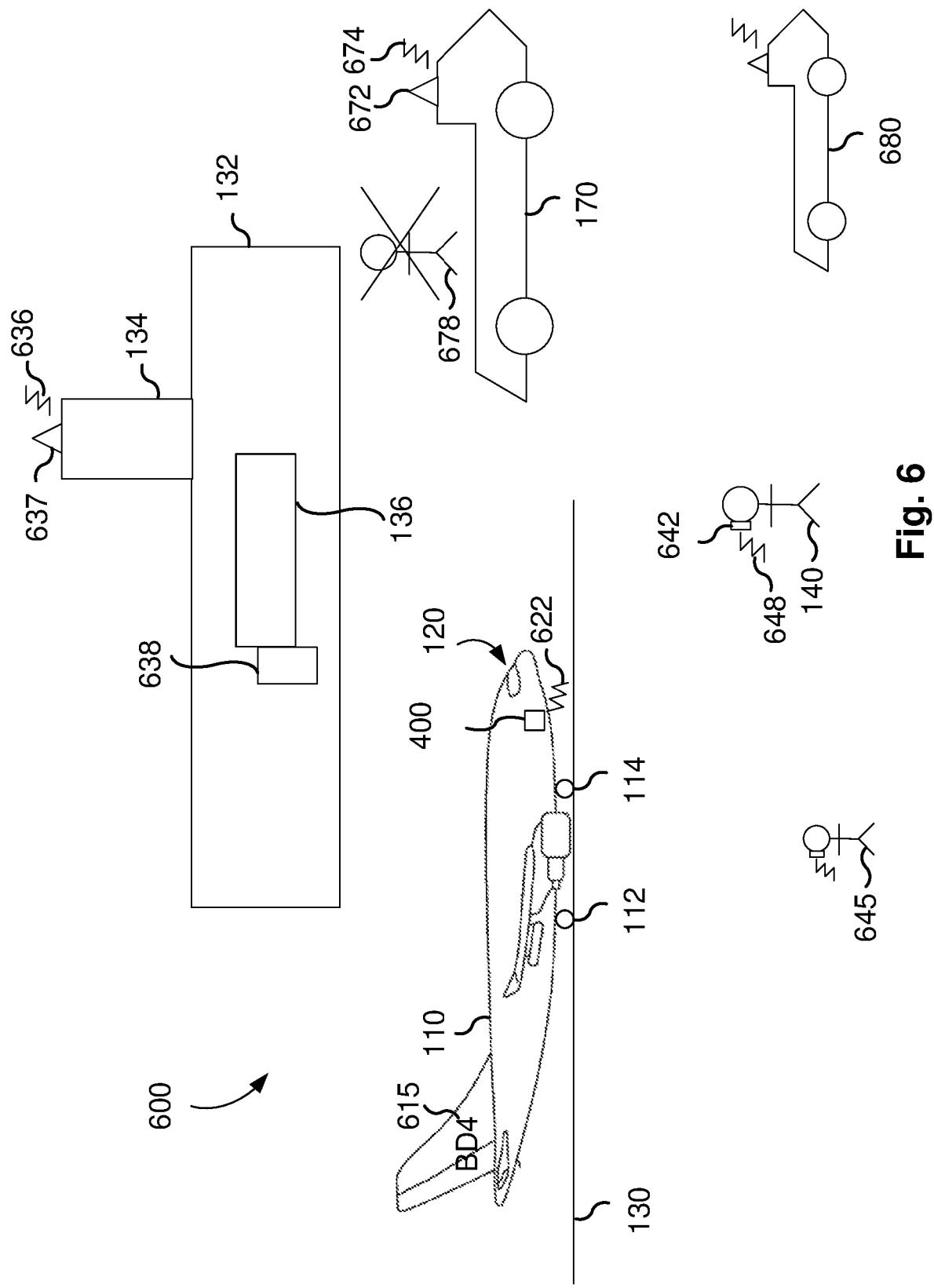
FIG. 6 schematically illustrates an exemplary generalized view of wireless ground intercom communication, in accordance with some embodiments of the presently disclosed subject matter.

Attention is now drawn to FIG. 6, schematically illustrating an example generalized view of wireless ground intercom communication, in accordance with some embodiments of the presently disclosed subject matter. This figure depicts non-limiting possible uses of access-door-integrated wireless intercom system 300 in airport applications, in place of, for example, cable-based solutions such as those in 100. In the example of the figure, the components 200 of the ground intercom system's external interface have been retrofit, and the components are now those of 400. Reference 622 schematically indicates the wireless communication over the air to/from antenna 370 of the interface 400.

In some examples, the external communications systems are wireless. In some examples, they are deployed on or associated with other systems, or with people. For example, in the figure, ground personnel member 140 is wearing or carrying a portable communications system such as wireless headphones/microphone 648, which are configured to be wearable and/or carryable. Note that system 642 has no cable 145. Similarly, in the example of the figure, vehicle 170 has deployed on it, or in it, wireless vehicular communication system 672, which has no cable 175. In some examples, vehicle 170 is a ground vehicle, e.g. Taxibot®. In another example, vehicle 170 is another vehicle, e.g. an aircraft.

Note that in the example of the figure, the terminal 132 also has a wireless terminal communication system 637, e.g. mounted on control tower 134. This system 637 can provide ground intercom communication 636 between the pilot 120 and personnel of control room(s) 136. In the non-limiting example of FIG. 6, the terminal also includes a user-switching system 638. Switching system 638 functions in some examples in a manner similar to that of users switching module 394 of processor 322; more detail is disclosed further herein with reference to FIG. 7. In some examples, the user-switching system 638 is referred to herein also as a communications switching system. In some examples, wireless terminal communication system 637 is deployed on, or associated with, user-switching system 638.

In some examples, the switching system 638 may have at least some of the components of an access-door-integrated wireless intercom system 300, disclosed with reference to FIG. 3A, such as, for example, an antenna, transceiver 343, modem 340, SIM 345, and processing circuitry 320. In some examples, the processor (not shown) of system 638 may have at least some of the modules disclosed with reference to processor 322 of FIG. 3B. In some examples, system 638 does not include at least a module comparable to intercom interface module 383, since a system that is located in terminal 132 will in some cases not plug directly into sockets 220, 222 of the aircraft's ground intercom access panel 123.

Wireless communication to/from the above-disclosed external systems is illustrated schematically by 648, 674, 636.

In some examples, the aircraft 110 intercom has wireless communication 622 to any or all of a ground crewman 648, a vehicle 674, or the terminal 636. In some examples, this wireless communication is two-way communication between the ground intercom of aircraft 110 and the relevant external system 642, 672, 637. In some non-limiting examples, this wireless communication is one or more of cellular communication (e.g. GSM, UMTS, LTE, 5G), WiMAX, or comparatively short-distance wireless protocols such as WiFi, Bluetooth and DECT. In some examples, wireless system 300 supports multiple wireless communication protocols, and the communication protocol is selectively used by the processing circuitry based on the one or more communication protocol(s) supported by that particular one external system. In some examples, the communication protocol which is used to connect with a particular external system is based on the one or more communication protocol(s) supported by that particular one external system. As one non-limiting example, the ground crewman's system 642 supports only DECT, while communications system 637 associated with the terminal 132 supports both WiMax and LTE. System 300 may then choose to communicate 622, 648 with the crewman using DECT, and use one of WiMax and LTE to communicate 622, 636 with the terminal staff.

In some examples, aircraft 110 is an airplane. In other examples, it is a helicopter.

In the figure, the identification number 615 appears on the tail of the aircraft. In some non-limiting examples, this is utilized for identifying the aircraft. Methods and uses of such identification are disclosed further herein with reference to FIG. 7.

In some cases, use of an access-door-integrated wireless intercom system 300 has at least some or all of the following example advantages, compared to a cable-based intercom system such as disclosed with reference to FIG. 2. As there are no cables 145, 175, there is no need to have a human perform the connection and disconnection between the cables and access panel 123. This can in some cases simplify the set-up and tear-down of ground intercom communication to the pilot 120. It also can, in some cases, increase the safety of ground crewman 140, who need not get in proximity to the aircraft 110 and its engines. Secondly, in a case where vehicle 170 is an autonomous vehicle, there is no need to have a second person 178 ride or otherwise escort the otherwise-unmanned vehicle, just to perform the manual connect/disconnect of the cables—indicated in the figure by the "cross-out" of unneeded ground crewman 678. Also, the autonomous vehicle 170 need not be especially designed to accommodate an unneeded crewman 678.

In addition, considering the cables 145, 175 themselves, at least some of them need not be kept in the airport inventory, and need not be maintained and serviced. Secondly, since there is no cable in the communication process of FIG. 6, there is no risk of the cable 145, 175 getting caught, torn or otherwise damaged. Thirdly, intercom communication distances using system 300 are limited by the particular wireless technology used, and are not limited by the length of the particular cable 145, 175 used.

Furthermore, system 300 in some examples enables the implementation of "autonomous pushback" utilizing an autonomous vehicle 170, which requires autonomous communication with pilot 120 that does not require manipulation of cables 175.

Also, the use of wireless intercom communication 622, 636, 674, instead of cable 145, 175 may in some examples enable intercom communication between the pilot 120 and systems that are not able to maintain such intercom communication using a cable-based system. Non-limiting examples of these are ground-based systems such as 637, 638 associated with the airport terminal, or systems 672 associated with another airplane.

The solution of wireless system 300 provides at least certain example advantages over the use of other wireless technologies. Firstly, in some examples, it is required that initial communication from the external system to the ground intercom be enabled within a short time. This may be required, in some cases, to allow automatic alerts, for example, to reach the pilot 120 when he is about to crash into an object, etc. Example alerts in the case of a Taxibot® vehicle 170 include "fail active", "vehicle about to stop", "vehicle is stopping", "airplane is too fast". In such a case, the pilot must both receive the alert, and be able to process it and react to it, e.g. by stepping on the brake, within a time that is short enough to avoid an accident. In some cases, this short time for establishment of communication is a fraction of a second. In some cases, it is within 0.5 second.

Thus, wireless technologies utilizing handshakes that may sometimes take several seconds, and/or that are do not guarantee successful setup within the required time, or that are at risk of losing the signal during communication, are in some cases less desirable for use in the application of situation 600, compared to using the technologies of system 300.

By contrast, a system such as Aircraft Communications Addressing and Reporting System (ACARS) is not sufficiently real-time to be useful for alerts to the pilot. Similarly, Very High Frequency (VHF) communication may, in some cases, require 4-5 iterations of communication between the pilot and the external system to set up full communication.

Secondly, in some cases it is desirable to enable point-to-point or peer-to-peer communication, directly between only a particular external system or person, and only a particular pilot 120—without other pilots or other extraneous personnel listening in (as occurs in a broadcast, using technologies such as VHF and High Frequency (HF)). Similarly, peer-to-peer communication, rather than broadcast communication, may in some cases ensure that that aircrew personnel 120 are not bothered by irrelevant voice communications, and need not make the effort to pick out and distinguish the specific communications destined for them out of the other, irrelevant, communications.

For at least the above reasons, in some examples, wireless communication technologies such as HF, VHF, which are for broadcast, as well as ACARS, are less desirable for wireless intercom system 300.

Thirdly, certain technologies such as VHF use a relatively small number of frequencies. Technologies that can use a relatively larger number of frequencies are capable, in some examples, of enabling the use of system 300 also when certain wireless frequencies are not available in the airport, for example.

Fourthly, in some examples, cost of the technology and its related equipment are a factor in system design. Use of at least some of the above-mentioned technologies is of relatively high cost, as opposed to use of, for example, cellular communication, WiFi, WiMAX, Bluetooth and DECT. For example, HF, VHF and ACARS equipment on airplanes is designed for communication while the aircraft 110 is in the air, and must meet flight-grade technical requirements. Such equipment thus is of a comparatively more robust, reliable and expensive nature, in some examples. In some examples, such complex and costly technologies are not required for ground-intercom communication.

Fifthly, communication using technologies such as Bluetooth is in some cases harder to break into than communication using some other technologies. As an example, this can in some cases increase the safety of aircraft procedures such as taxiing and docking, since malicious or unauthorized personnel cannot easily get a link and give wrong instructions to pilot 120.

An access-door-integrated wireless intercom system 300, in which components are fixedly mounted on access door 360, has at least certain advantages over certain other wireless intercom solutions. For example, solutions such as detachable Bluetooth (utilizing e.g. a removable Bluetooth transmit/receive dongle), require that a wireless communication unit be attached and detached to/from the aircraft 110, and audio plugs be manually connected and disconnected from sockets 220, 222 by a crewman such as 140. In some examples, this attach/connect/plug and detach/disconnect/unplug procedure must be performed at least every time the aircraft 110 is about to take off, and every time it lands.

As disclosed above, system 300 has none of the disadvantages of this required continual human involvement. Instead, a one-time retrofit of existing aircraft 110 is performed, whereby the access door 240 is replaced, only once, by special access door 360, in some examples containing on it the antenna 370 and circuit assembly 310—for example by unscrewing and screwing e.g. 4 or 8 screws that attach the access doors to hinge 230. As part of the retrofit, the plug(s) 335, 336 are at that time plugged into sockets 220, 222. From then on, no additional manipulation of the access door 360, and of the wireless communications components, is required. System 300 need not be detached after every use, for example before every takeoff. The aircraft 110 can maneuver in an airport while engaging in ground intercom communication. It can then takeoff, fly, and land at another airport, and can engage in ground intercom communication with local external systems of the other airport, all without opening the access door 360.

In some examples, once system 300 is installed, there is no need to open and close the access door 360, except when performing non-intercom tasks that involve the access panel 123, such as for example connecting power cable 275 using plug 270, or for example when performing required maintenance on system 300.

Moreover, in examples where system 300 utilizes spring-loaded plugs, such as disclosed with reference to spring assembly 420 in FIGS. 5B, 5C, the connection of the plugs is done in one action, closing and locking the door while engaging the plugs and the sockets, without manipulation of wires/cables 338. In some examples, this avoids the risk of wires 338 getting caught when closing the door, for example.

In some examples, there are at least certain advantages to performing the above-disclosed retrofit 400, as opposed to a solution where the wireless-to-intercom interface circuitry is fixedly installed onto or inside of access panel 123. Firstly, a retrofit as disclosed herein, involving detaching and attaching an access door, and plugging connectors in sockets, is, in some examples, a much simpler process than modifying aircraft 110 by implementing a wireless ground intercom interface within the access panel. The impact of such a solution on the aircraft is minimal. Such a solution avoids the required design effort for an alternative solution—one that is placed within the aircraft, and that has connections within the aircraft, with its attendant costs and engineering time. Re-use is made of the access panel 123, which is already designed to provide easy access to aircrew 120 from outside of airplane 110. Secondly, the impact on aircraft operations is minimized.

Thirdly, there are in some cases strict regulations for performing modifications in design of flight-critical portions of the aircraft, for example those located inboard of the access panel 123. On the other hand, the access door 240, 360 is not a flight-critical area of the airplane, since it serves only for ground communications, and in some examples the airplane is designed to maintain flight even when the access door is broken off or otherwise not present. Also the physical interface for the aircraft's ground intercom remains the same as in prior art implementations (that is, plugs such as 335, 336 plugged into sockets 220, 222). Thus the replacement of door 240 by door 360 replacement may be performed in some examples while obtaining simpler and easier regulatory/safety approval, as compared to approval of other solutions such as those involving re-design of portions of the aircraft. Furthermore, the geometry of the access door 360 is comparable to that of the existing access door 240, which already has regulatory approval.

In addition, mounting or printing of the antenna 370, within the skin of door 360, utilizing the recess 510 in door 360, minimizes, in some examples, undesirable aerodynamic impacts (such as drag) of adding the antenna 370—as compared to, for example, other physical implementations, of a wireless antenna for ground intercom access, on the outside of aircraft 110.

An access-door-integrated wireless intercom system 300 may, in some examples, have the additional advantage of improving existing applications, in that quick direct communication via a wireless voice communication link 622 to and/or from aircrew 120 is enabled. In addition, system 300 may, in some examples, have the additional advantage of supporting new ground-intercom-based services, that at least, in some cases, are not capable of being provided using the ground interface disclosed in situation 200. Such a solution may enable one-way and/or two-way communication between aircrew 120 and additional ground crew personnel 645 and service vehicles 680, with whom the aircrew do not currently communicate in a cable-based intercom environment.

As one example of such, a Ground Collision Alert service may be enabled, whereby the pilot 120 is alerted (by human voice and/or by automated speech or tone(s)) by an external system when airplane 110 is at risk of colliding with the terminal, a pole, another airplane, a vehicle etc. As a second example, a Gate Docking service may be enabled, whereby the pilot 120 is in intercom communication with the relevant ground personnel 645 involved in the process of docking the airplane 110 at the relevant gate of terminal 132. In this sensitive situation, the pilot 120 typically maneuvers airplane 110 in the vicinity of another structure, other airplanes etc., while having only limited visibility of their own airplane 110. A wireless-intercom Gate Docking service may in some examples provide an improved, more efficient and safer docking process, as compared to current methods which rely on the waving of flags.

As a third example, wireless intercom system 300 may, in some examples, enable robotic applications, such as fueling, waste removal, luggage handling etc. These are in some examples performed by autonomous/robotic systems (not shown) on autonomous vehicles 680, whereby the pilot 120 is in intercom communication with such autonomous systems, for example to receive alerts. As a fourth example, a Follow Me service may be enabled, whereby the airplane 110 follows a vehicle 680, or in some cases follows runway lights (not shown), which guide the airplane during the airplane's maneuver between the gate or hangar, and the runway. Vehicle 680 can be in direct intercom communication with the pilot 120 during this maneuver.

As a fifth example, a cellular communication service may be enabled, whereby the pilot 120 is in communication with various cellular terminals, including in some cases those of their home airline's offices, home airport, home control center and/or neighboring airplanes 170 of the same airline, located in the same airport. This can be enabled, in some examples, utilizing SIM card 345 of FIG. 3A, e.g. a SIM of the pilot's home country, communicating via modem 340 and transceiver 343 to cellular destinations over cellular networks. Modem 340 and processor 320, for example, provide an interface between the intercom protocols and the relevant cellular protocols. Cellular communication to e.g. local terminal 132 via external system 637 is also supported, in some examples. In another example, police/law-enforcement, fire department and security personnel can speak to the pilot via cellular communication to the intercom.

In some examples, at least some of such services disclosed above utilize communications set-up and disconnection functionalities disclosed further herein with reference to FIG. 7. Note also that the above are non-limiting examples of additional services facilitated by system 300.

Note that in many typical airport situations, airplane 110 moves over time from place to place in the airport (e.g. terminal gate, hangars, taxiways, runways etc.), and between different ground services and functions (docking, fueling, leaving a gate, taxiing, entering and leaving a runway etc.). Such scenarios of movement may be enabled by a user-switching functionality, in which a user-switching system 394, 638 connects the aircrew 120, in turn, to different external systems and personnel 642, 140, 645, 170, 680, 637, as the service needs of airplane 110 change. All of these connections are over wireless intercom communication links 622, 648, 674, 648, utilizing system 300 and the on-board ground intercom system (not shown) of the airplane. In at least this sense, the communication utilizing system 300 may, in some examples, be referred to as multi-point-to-point, in that direct point-to-point intercom communication with aircrew 120 is enabled for multiple external systems and personnel 642, 645, 170, 680, 637. Switching functionalities are disclosed further with reference to FIG. 7.

FIGS. 3A, 3B, 4, 5A, 5B, 5C, and 6 illustrate only a general schematic of the system architecture, describing, by way of non-limiting example, certain aspects of the presently disclosed subject matter in an informative manner only, for clarity of explanation only. It will be understood that that the teachings of the presently disclosed subject matter are not bound by what is described with reference to FIGS. 3A, 3B, 4, 5A, 5B, 5C, and 6.

Only certain components are shown, as needed, to exemplify the presently disclosed subject matter. Other components and sub-components, not shown, may exist. Systems such as those described with respect to the non-limiting examples of FIGS. 3A, 3B, 4, 5A, 5B, 5C, and 6, may be capable of performing all, some, or part of the methods disclosed herein.

Each system component and module in FIGS. 3A, 3B, 4, 5A, 5B, 5C, and 6 can be made up of any combination of software, hardware and/or firmware, as relevant, executed on a suitable device or devices, which perform the functions as defined and explained herein. The hardware can be digital and/or analog. Equivalent and/or modified functionality, as described with respect to each system component and module, can be consolidated or divided in another manner. Thus, in some embodiments of the presently disclosed subject matter, the system may include fewer, more, modified and/or different components, modules and functions than those shown in FIGS. 3A, 3B, 4, 5A, 5B, 5C, and 6. To provide one non-limiting example of this, in some examples the modem interface module 387 and intercom interface module 383 can be combined. Similarly, in some examples, there may be a separate modem interface module 387 implementing each of the wireless technologies (e.g. Wi-Fi, DECT, GSM/UMTS, CDMA) supported by access-door-integrated wireless intercom system 300. As another example, in some cases, the functions of authorization module 392 and users switching module 394 can be combined. As still another example, in some cases, the functions of authorization module 392 and communication-link setup control module 385 can be combined. Similarly, in some examples, a module (not shown) separate from module 385 can be utilized for tear-down or disconnection of wireless intercom communication links.

One or more of these components and modules can be centralized in one location, or dispersed and distributed over more than one location, as is relevant.

Each component in FIGS. 3A, 3B, 4, 5A, 5B, 5C, and 6 may represent a plurality of the particular component, possibly in a distributed architecture, which are adapted to independently and/or cooperatively operate to process various data and electrical inputs, and for enabling operations related to connecting, maintaining and disconnection wireless intercom communication. In some cases, multiple instances of a component may be utilized for reasons of performance, redundancy and/or availability. Similarly, in some cases, multiple instances of a component may be utilized for reasons of functionality or application. For example, different portions of the particular functionality may be placed in different instances of the component. Those skilled in the art will readily appreciate that the components of systems 300, 310 and 322, for example, can be consolidated or divided in a manner other than that disclosed herein.

Communication between the various components of the systems of FIGS. 3A, 3B, 4, 5A, 5B, and 5C, in cases where they are not located entirely in one location or in one physical component, can be realized by any signaling system or communication components, modules, protocols, software languages and drive signals, and can be wired and/or wireless, as appropriate. The same applies to interfaces such as 355, 388.

Attention is now drawn to FIG. 7, illustrating one example of a generalized flow chart diagram, of a the flow of a process or method 700, for selectively providing wireless communication, in accordance with certain embodiments of the presently disclosed subject matter. This process is, in some examples, carried out by systems such as those disclosed with reference to FIGS. 3A, 3B, 4 and 6.

The flow starts at 705. According to some examples, initiation of wireless intercom communication 648, 674, 636 with the aircraft is requested by an applicant, that is by an external communication system 642, 645, 672, 680, 637 desiring intercom communication (block 705). In some examples, the request includes information indicative of the external system, e.g. an ID number or a name of the ground crewman 642, 645. In some examples, the request to initiate the wireless communication comprises information indicative of the aircraft 110. As is disclosed forthwith, in some implementations the process for setting up the wireless intercom communication with the aircraft 110 is based on this information.

In some examples, the request may arrive over the air interface 648, 622 to processor 322, going via antenna 370, wiring 355, transceiver 343, and modem 340 (see FIG. 3A). Within processor 322, in some examples this incoming request arrives via modem interface module 387 to communication-link setup control module 385 (see FIG. 3B). Module 385 receives the request and begins handling the incoming request.

According to some examples, a determination is made whether or not aircraft 110 is on the ground (block 710). Some non-limiting examples of detecting an on-ground state include: detecting Weight on Wheels (WOW), an altimeter reading, a temperature reading, and a speed reading—in some cases all utilizing aircraft sensors. For example, communication-link setup control module 385 utilizes on-ground detection module 381 to interface with the relevant detecting sensors (not shown in the figures) and to make this determination.

In some examples, in response to a determination that the aircraft is not on the ground, the communication request is rejected (block 735). In some examples, it is not appropriate, and in some cases not safe, to enable ground intercom communication with e.g. pilot 120 while the aircraft 110 is still airborne.

According to some examples, in response to a determination that the aircraft is on the ground, the example flow proceeds to the next step, a check whether the requesting/applying external system is authorized for ground intercom communication with the particular aircraft 110 (block 713). For example, communication-link setup control module 385 may utilize authorization module 392 to perform this function. In some other examples, user-switching module 394 can be utilized. In some non-limiting examples, a list or database of authorized users is provisioned and maintained by the airport in memory 324, or in an external data store (not shown in the figures). In some examples, the list is a black- and/or white-list. In some examples, the information indicative of the external system (e.g. ID number), which was received in block 705, is compared to this list.

In some non-limiting examples, a particular user does 140, 170 not have global/general authorization for intercom communication, but is limited to particular aircraft. As one example of this, relevant ground and remotely-located personnel of airline X may be authorized to communicate with pilots of airline X aircraft, but not with pilots of airline Y or possibly of other airlines. Example methods for identifying aircraft and associated airlines are disclosed further herein.

In some examples, the authorization for a particular external system may be limited based on the location of the aircraft 110, the aircraft's state, its current activity, and/or its required service application. As one example of this, a gate-docking crewman 645 may be authorized to communicate with an aircraft only when the aircraft is within a certain distance from a gate, and not e.g. while it is on a runway.

The configuration of these authorizations is, in some examples, part of the design or establishment of the operation policies and methodologies of a particular airport.

According to some examples, a determination is made, based on the check of block 713, whether or not the requesting external system is authorized for the wireless communication (block 717). For example, communication-link setup control module 385 may utilize authorization module 392 to perform this function.

In some examples, in response to a determination that the requesting external system is not authorized, the communication request is rejected (block 735).

In some examples, there are more than two categories of authorization status, e.g. "authorized", "not authorized", and "authorized only if pilot approves request".

According to some examples, in response to a determination that the requesting external system is authorized, the example flow proceeds to the next step, a check of the prioritization status of the particular applicant (requesting external system) (block 720). For example, communication-link setup control module 385 utilizes user-switching module 394 to perform this function. In some non-limiting examples, a list or database of user prioritizations is provisioned and maintained by the airport in memory 324, or in an external data store (not shown in the figures). In some examples, this list is integrated with the authorization list disclosed with reference to block 713. This list may determine relative priority of the particular user (external system) for intercom communication. As one example of this, a system for collision alerts may have higher priority than a fueling vehicle or fueling crewman, due to safety concerns.

In some examples, the information indicative of the external system (e.g. ID number) that was received in block 705 is compared to this list.

In some non-limiting examples, a particular user does not have global/general priority for intercom communication, but is limited to particular aircraft. In some examples, the priority for a particular external system may be based on the location of the aircraft 110, the aircraft's state, its current activity and/or its required service application. As one example of this, gate-docking crewman 645 may have relative priority over certain other external systems to communicate with an aircraft only when the aircraft is within a certain distance from a gate, and not e.g. while it is on a runway.

The configuration of these priorities is in some examples part of the design or establishment of the operational policies and methodologies of a particular airport.

In some examples, the prioritization status is a yes/no value (prioritized or not). In some examples, the prioritization status is rather a level. For example, it is a relative level (e.g. A has higher priority than B and C, which have higher priority than D), or it is on a scale (e.g. A has a priority level of 5, B has a priority level of 3).

According to some examples, a determination is made, based on the check of block 720, whether or not the requesting external system/applicant has prioritization (or in some examples relative prioritization) for wireless intercom communication (block 725). In some examples, communication-link setup control module 385 utilizes user-switching module 394 to perform this function.

According to some examples, in response to a determination that the requesting external system is prioritized for intercom communication, e.g. has priority of a sufficiently high level, the example flow proceeds to the next step, the opening, establishing or enabling of a voice or other audio communication link between the ground intercom of the aircraft 110 and the particular applicant (requesting external system) (block 730). In some examples, communication-link setup control module 385 and/or user-switching module 394 may perform this function. The link is set up, in some examples, utilizing at least the following additional modules: (1) intercom interface module 383, to connect to the intercom of air crewman 120, via A/D and D/A converters 330, 333, connector plugs 335, 336, intercom access panel 123 including sockets 220, 222, and the aircraft's internal ground intercom system; (2) modem interface module 387 to access the requesting external system, e.g. via the modem 340, transceiver 343 and antenna 370.

In some examples, in a case where the intercom line to pilot 120 is free, the communications link to the requesting external system is established. In some examples, in a case where the intercom line to pilot 120 is busy with another communication, but the current requesting external system has higher priority, the other communication is disconnected, or in some cases suspended, while the communications link is instead established with the higher-priority requesting external system.

As one illustrative example of establishing prioritized communication, pilot 120 is in communication with his or her home airline, a remote external system not shown in FIG. 6, using cellular technology. The aircraft 110 then approaches too close to a structure, a sensor (not shown) detects this, and an alert system needs to immediately establish intercom communication with the same pilot 120. This alert uses for example terminal-associated external system 637 and DECT technology. A request 705 reaches the processor 322. After authorization 713, 717, the relevant module(s) of processor 322 determines that, in the current situation of the aircraft, the external system 637 has priority for intercom communication compared to the home airline system. An intercom communication link is established to system 637, and the earlier non-prioritized intercom communication link to the home airline is disconnected or suspended.

In some other examples, system 637 may "break-in" to the existing communication, and the alert be sent to the pilot while the earlier communication link to the home airline is still open, rather than the earlier communication link being torn down.

The switching of intercom communication link between external systems/users, or breaking in of communications to other external systems/users, is in some examples referred to herein also as a user-switching function. In some examples, this has at least certain example advantages over a cable-based solution such as 600. In contrast to that disclosed above with reference to blocks 725 and 730, in a cable-based system, one external system cannot connect to the aircraft's ground intercom, with a cable, until the other external system unplugs and physically disconnects their cable 145, 175.

According to some examples, in response to a determination that the requesting external system does not have priority, e.g. of a sufficiently high level, the example flow proceeds to the next step, a checking of the status of the line, that is the intercom communication link to e.g. pilot 120 (block 740).

According to some examples, in response to a determination that the intercom communication link or line is not free, the communication request 705 from the external system is rejected (block 735). Since it has been determined in block 725 that the requestor system has no prioritization, or an insufficiently high level of prioritization, the requestor system will not be allowed to override the currently busy intercom communication link to e.g. pilot 120.

According to some examples, in response to a determination that the intercom communication link or line is free, that is the ground intercom to air crewman 120 is not in use, a voice or other audio request is sent to the pilot or other air crewman 120, for example over their headphones (not shown in the figures) (block 750). For example, communication-link setup control module 385 sends this request via intercom interface module 383, and waits a defined time for an indication of a reply by air crewman 120.

According to some examples, a determination is made whether or not there was a reply or response from air crewman 120 within the defined time (block 755). According to some examples, in response to a determination that there was such a response, the nature of the air crewman's response (e.g. approve or refuse the opening of the intercom communication link) is determined (block 760). In one non-limiting example, voice recognition can be used to interpret the air crewman's verbal response. In another example, the configuration may be such that the air crewman can press the existing ground buzzer button to indicate approval of the opening of the intercom.

Note that in some other examples the pilot 120 can provide a one-time approval, e.g. upon landing, for specific external systems 642, 672, 637 to communicate with him or her during the plane's time on the ground. For example, the pilot may provide this approval to control room(s) 136, who provision this information into a database or list in switching system 638. Similarly, there may be specific external systems, such as those associated with crash alert, that may be pre-configured or pre-provisioned by control room personnel to not require pilot approval, when attempting to connect to any pilot. In such examples, the flow for those specific external systems can skip the steps associated with obtaining pilot approval for communication, e.g. 750, 755, 765, 770.

According to some examples, in response to a determination that opening the intercom communication link was refused or rejected, the communication request 705 from the external system is rejected (block 735). According to some examples, in response to a determination that opening the intercom communication link was approved, allowed or accepted, the example flow proceeds to the next step, the opening or enabling of the voice or other audio communication link between the ground intercom of the aircraft 110 and the particular applicant (requesting external system) (block 730).

According to some examples, in response to a determination that there was no such pilot/air-crew response, a determination is made whether a defined maximum number of voice-request attempts have been made (block 770). According to some examples, in response to a determination that the maximum number of attempts has already been reached, the communication request 705 from the external system is rejected (block 735). That is, the intercom voice communication link is, in such a case, enabled only responsive to receiving the approval response from the air crewman within a defined number of air crewman request attempts.

According to some examples, in response to a determination that the maximum number of attempts has not been reached, the flow loops 775 or reverts back to block 750, and another audio/voice-request to air crewman 120 is sent.

In some examples, communication-link setup control module 385 performs all of blocks 740, 745, 755, 760, 770, 775.

Note that in some other examples (not shown in the example flow of 700), the communication link between the ground intercom of the aircraft and the at least one external system is enabled (block 730), in response to determining at block 717 that the requesting external system is authorized for the wireless communication. In such examples, prioritization, line status and pilot approval are not verified.

In some examples, a method such as 700 is capable of ensuring one or more of the following: that wireless ground intercom communication occurs only when the aircraft 110 is on the ground, that only authorized external systems can communicate via wireless intercom interface 622 to pilot 120, that external systems with relatively higher priority get prioritized access to the pilot, and that the pilot has, in some situations, control over whether or not the intercom communications link to them will be opened.

Note that method 700 discloses the non-limiting example of the external system initiating establishment of a communication link with pilot 120. In other examples, similar methods can be utilized in a case where the pilot 120 initiates establishment of a communication link with an external system, mutatis mutandis.

It should also be noted that in the above example flow 700, many of the actions are performed by processor 322 of circuit assembly 310 within access-door-integrated wireless intercom system 300. In other examples, some or all of the actions and steps of flow 700 are instead performed by a user-switching system or center 638, associated with control room(s) 136 and airport terminal 132. In such implementations, system 638 can perform mediation and interface functionalities between external systems such as 642, 645, 472, 680, 637 and the wireless intercom system(s) 300 of airplane(s) 110.

In some examples, the user-switching system 638 interfaces with wireless intercom system 300 over the air, e.g. using a wireless connection 636, 622 between terminal-based communications system 637 and antenna 370. In some examples, system 638 includes an on-ground detection module comparable to system 300's on-ground detection module 381. Such a module could, in one example, receive information on aircraft 110's in-flight/on-ground status from control tower 134. In a second example, sensors such as cameras, positioned e.g. on the runway, provide such information to system 638's on-ground detection module.

In some cases, use of system 639 can have at least certain non-limiting example advantages, over placing all these functions in processor 322, such as:

A. Since user-switching center 638 is in some examples located in a building rather than onaccess door 360, it can be sized such that it can more efficiently perform the various functions of flow 700. In some examples, this enables the use of less-complex, smaller, and possibly lower-cost, processors 322, memories 324 and/or circuit assemblies 310, on the access door 360.

B. Since user-switching center 638 is in some examples part of control room(s)/control center 136, it can be provisioned with more comprehensive lists of the various different external systems 642, 645, 472, 680, 637, aircraft 110 and airlines, for example. It thus may have a more full and comprehensive view of the different possible end points of intercom communication in the airport. System 638 may thus be able to perform service logic that is more complex, and in some cases more accurate and suited for the airport operations, for example in the areas of authorization, prioritization and switching of users.

In some examples, various splits of functionality between processor 322 and user-switching system 638 are possible.

Modules 385 and/or 394, and switching system 638, are in some examples referred to herein also generally, as switching components, switching centers or simply switches, in at least the sense that they can perform user-switching functions based on prioritization in blocks 720, 725. In some examples, authorization module 392 is also referred to herein as a switching component, in that it makes decisions whether or not to establish communication links towards pilot 120.

Note that in some examples, the methods of process 700 may in some examples be referred to as providing multi-point-to-point communication, in that direct point-to-point or peer-to-peer intercom communication with aircrew 120 can be enabled for multiple external systems and personnel 642, 645, 170, 680, 637, for example by the switching component(s) 385, 394, 638. In some examples, the point-to-point communication is moved from one user to another, based on a prioritization method such as disclosed in method 700.

In some examples, method can optionally include additional steps/blocks, not shown in FIG. 7. For example, there can be in some cases a step in which the aircraft 110 is identified. Some non-limiting examples of identifying the aircraft are as follows:

a) A ground crewman 140, 645 scans a barcode (not shown in FIG. 6) on the outside of airplane 110, with a scanning system. The information can, in some cases, be sent by the scanning system to another system, e.g. to switching system 638, or to some other system in control center 136.

b) Identifying the aircraft is based on an identification (ID) number located on the aircraft. In some non-limiting examples, the identification number 615 (in FIG. 6) appears on the tail of the aircraft. For example, the airport may have one or more cameras or other imaging devices (not shown in FIG. 6), carried by ground personnel 140, 645, and/or mounted on vehicles 170, 680 and/or on structures such as 132. In some examples, the aircraft identification method utilizes automated image recognition, e.g. of the ID number on the tail. The determined ID number, and/or the captured image(s), can in some cases be sent by the imaging device to another system, e.g. to switching system 638, or to some other system in control center 136.

In some examples, aircraft identification information is captured at some point before or after aircraft landing, and can be provided to the relevant system (e.g. switching system 638 and/or wireless intercom system 300) before flow 700, in parallel with various blocks of flow 700, or between various blocks of flow 700.

As disclosed above with reference to flow 700, determinations such as user authorization and user prioritization, for example, can in some cases be based on the identity of aircraft 110. In one non-limiting example, switching system 638 or communication-link setup control module 385 of wireless intercom system 300 requests the imaging of an aircraft tail as part of user authorization check 713 or of prioritization check 720.

Note that the above description of process 700 is a non-limiting example only.

In some embodiments, one or more steps of the flowchart exemplified herein may be performed automatically. The flow and functions illustrated in the flowchart figures may for example be implemented in systems 300, 310 and processing circuitry 320, and may make use of components described with regard to FIGS. 3A, 3B, 4, 5A, 5B, 5C, and 6. It is also noted that whilst the flowchart is described with reference to system elements that realize steps, such as for example systems 300, 310, and processing circuitry 320, this is by no means binding, and the operations can be carried out by elements other than those described herein.

It is noted that the teachings of the presently disclosed subject matter are not bound by the flowcharts illustrated in the various figures. The operations can occur out of the illustrated order. One or more stages illustrated in the figures can be executed in a different order and/or one or more groups of stages may be executed simultaneously. For example, steps 720 and 740, shown in succession, can be executed substantially concurrently, or in a different order. Similarly, some of the operations or steps can be integrated into a consolidated operation, or can be broken down into several operations, and/or other operations may be added. As one non-limiting example, in some cases blocks 713 and 720 can be combined. Another example is the additional operation of aircraft identification, disclosed above with reference to for example ID number 615.

In embodiments of the presently disclosed subject matter, fewer, more and/or different stages than those shown in the figures can be executed. As one non-limiting example, certain implementations may not include the authorization-verification blocks 713, 717 the prioritization blocks 720, 725, and/or the aircraft identification actions.

In the claims that follow, alphanumeric characters and Roman numerals, used to designate claim elements such as components and steps, are provided for convenience only, and do not imply any particular order of performing the steps.

It should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be, at least partly, a suitably programmed computer. Likewise, the presently disclosed subject matter contemplates a computer program product being readable by a machine or computer, for executing the method of the presently disclosed subject matter, or any part thereof. The presently disclosed subject matter further contemplates a non-transitory machine-readable or computer-readable memory tangibly embodying a program of instructions executable by the machine or computer for executing the method of the presently disclosed subject matter or any part thereof. The presently disclosed subject matter further contemplates a non-transitory computer readable storage medium having a computer readable program code embodied therein, configured to be executed so as to perform the method of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system configured to enable wireless communication between a ground intercom of an aircraft and at least one external system, the system comprising:
   a) an access door of a ground intercom access compartment of the aircraft, the access door configured to be fixed to the ground intercom access compartment;
   b) a wireless ground intercom communication processing circuitry comprised in the access door; and
   c) at least one antenna comprised in the access door, operatively coupled to the wireless ground intercom communication processing circuitry;
   wherein the ground intercom access compartment comprising a ground intercom access panel, the ground intercom access panel comprising at least one socket;
   wherein the wireless ground intercom communication processing circuitry is operatively connectable to the ground intercom of the aircraft via the ground intercom access panel, wherein the connecting of the wireless ground intercom communication processing circuitry to the ground intercom access panel is via at least one plug connected to the wireless ground intercom communication processing circuitry and configured to be plugged into the at least one socket of the ground intercom access panel, thereby enabling retrofit of a communication system on an aircraft;
   wherein the wireless ground intercom communications processing circuitry is configured to selectively provide wireless communication, via the at least one antenna, between the ground intercom of the aircraft and the at least one external system.

2. The system of claim 1, wherein the at least one antenna is configured such that an external surface of the at least one antenna is substantially flush with an external surface of the access door.

3. The system of claim 2, wherein at least one of the following is true:
   (i) the access door comprises a recess on an external side, the recess configured to enable mounting of the at least one antenna; or
   (ii) the at least one antenna is printed on the external surface of the door.

4. The system of claim 1, wherein at least one of the following is true:
   (A) the fixed mounting of the access door to the ground intercom access compartment utilizes at least one hinge;
   (B) the access door comprising at least one latch, the latch being configured to enable closing the access door;
   (C) the at least one plug configured with a return spring;
   (D) the wireless communication between the ground intercom and the at least one external system comprises two-way communication;

(E) the wireless communication utilizes at least one of: cellular communication, WiFi, WiMAX, Bluetooth and DECT;

(F) the system is configured to enable initial communication from the at least one external system to the ground intercom within 0.5 seconds; or (G) the aircraft is an airplane.

5. The system of claim 4, wherein the system supports multiple wireless communication protocols, wherein a communication protocol is selectively used by the wireless ground intercom communication processing circuitry based on a communication protocol supported by the at least one external system.

6. The system of any one of the previous claims, wherein the at least one external system comprises at least one ground-based system, wherein the at least one ground-based system is deployed on at least one of: a ground vehicle, a system carryable by a ground personnel, a control tower, a communications switching system and another vehicle.

7. The system of claim 6, wherein at least one of the following is true:

(I) the ground vehicle is a Taxibot®; or (II) the other vehicle is an aircraft.

8. The system of claim 1, wherein the wireless ground intercom communication processing circuitry is configured, for selectively providing the wireless communication, to:

a) in response to receiving a request to initiate the wireless communication between the ground intercom at least one external system and the aircraft, the request comprising information indicative of the at least one external system, determine whether the at least one external system is authorized for the wireless communication; and b) in response to determining that the at least one external system is authorized for the wireless communication, enable a voice communication link between the ground intercom of the aircraft and the at least one external system.

9. The system of claim 1, wherein the selectively providing the wireless communication is performed in response to detecting that the aircraft is on the ground.

10. The system of claim 9, wherein the detecting that the aircraft is on the ground comprises at least one of: detecting Weight on Wheels (WOW), an altimeter reading, a temperature reading, a speed reading.

11. The system of claim 8, wherein the enabling of the voice communication link is performed response to at least one of the following:

i) determining that the at least one external system is prioritized for intercom communication;

ii) determining that the at least one external system is not prioritized for intercom communication and that the ground intercom is not in use; or iii) sending a request to an air crewman and receiving an approval response from the air crewman.

12. The system of claim 11, wherein the enabling of the voice communication link is performed iv) responsive to receiving the approval response from the air crewman within a defined number of air crewman request attempts.

13. The system of claim 11, wherein the determining that the at least one external system is prioritized for the intercom communication is performed by utilizing a switching component.

14. The system of claim 8, wherein at least one of the following is true:

(I) the determining whether the at least one at least one external system is authorized for the wireless communication is performed utilizing a switching component; or (II) the request to initiate the wireless communication comprises information indicative of the aircraft.

15. The system of claim 13, wherein at least one of the following is true:

(A) the switching component is comprised in the system; or (B) the switching component is associated with an airport terminal.

16. The system of claim 14, wherein said step (a) further comprises identifying the aircraft.

17. The system of claim 15, wherein the identifying the aircraft comprises at least one of scanning a barcode and identifying an identification number on the aircraft.

18. The system of claim 17, wherein at least one of the following is true:

(i) the identifying of the identification number on the aircraft utilizes automated image recognition; or (ii) the identification number appears on a tail of the aircraft.

19. A method of refitting a communication system of an aircraft, the method comprising:

I) detaching an existing access door of a ground intercom access compartment of the aircraft, wherein the ground intercom access compartment comprising a ground intercom access panel, the ground intercom access panel comprising at least one socket;

II) fixedly attaching an intelligent access door to the ground intercom access compartment, wherein the intelligent access door comprises:

a) at least one antenna; and b) a wireless ground intercom communication processing circuitry, operatively coupled to the at least one antenna, the wireless ground intercom communications processing circuitry being configured to selectively provide wireless communication, via the at least one antenna, between a ground intercom of the aircraft and the at least one external; and III) plugging, into at least one socket of the ground intercom access panel, at least one plug connected to the wireless ground intercom communication processing circuitry, thereby operatively connecting the wireless ground intercom communication processing circuitry to the ground intercom of the aircraft via the ground intercom access panel.

* * * * *